(12) United States Patent
Monty et al.

(10) Patent No.: US 10,280,617 B2
(45) Date of Patent: May 7, 2019

(54) STRUCTURAL CONNECTOR

(71) Applicant: Burmon Holdings Pty Ltd, Miami (AU)

(72) Inventors: Stephen Monty, Miami (AU); Michael Burchell, Miami (AU)

(73) Assignee: BURMON HOLDINGS PTY LTD, Adams Avenue, Miami, Queensland (AU)

( * ) Notice: Subject to any disclaimer, the term of this patent is extended or adjusted under 35 U.S.C. 154(b) by 6 days.

(21) Appl. No.: 14/908,536

(22) PCT Filed: Feb. 6, 2014

(86) PCT No.: PCT/AU2014/000084
§ 371 (c)(1),
(2) Date: Jan. 28, 2016

(87) PCT Pub. No.: WO2014/121326
PCT Pub. Date: Aug. 14, 2014

(65) Prior Publication Data
US 2016/0168840 A1   Jun. 16, 2016

(30) Foreign Application Priority Data
Jul. 29, 2013 (AU) .................. 2013209390

(51) Int. Cl.
*E04B 1/00* (2006.01)
*E04C 3/02* (2006.01)
(Continued)

(52) U.S. Cl.
CPC .............. *E04C 3/02* (2013.01); *E04B 1/26* (2013.01); *E04B 7/045* (2013.01); *F16B 7/0493* (2013.01);
(Continued)

(58) Field of Classification Search
CPC .... E04B 1/1903; E04B 1/38; E04B 2001/199; E04B 2001/1993; E04B 2001/196; E04B 1/21; E04B 1/2604; E04B 1/2608; E04B 1/2612; E04B 1/41; E04B 2001/2644; E04B 2001/268; E04B 2001/2684; E04B 2001/405; E04B 2001/4192; E04B 7/045; E04C 3/02; F16B 15/0023; F16B 15/003; F16B 15/0053; F16B 2015/0061
(Continued)

(56) References Cited

U.S. PATENT DOCUMENTS 1,423,991 A    7/1922  Brooks
2,258,574 A *  10/1941 Leary ............... E04B 2/842
                                              52/285.3
(Continued)

*Primary Examiner* — Chi Q Nguyen
(74) *Attorney, Agent, or Firm* — Panitch Schwarze Belisario & Nadel LLP

(57) ABSTRACT

A structural connector for fastening structural components together includes a floor. Two spaced sidewalls extend from respective sides of the floor, the floor and the sidewalls defining a channel in which a first of the structural components can be received. The sidewalls are configured so that the sidewalls can be fastened to the first structural component. A positioning arrangement is operatively arranged with respect to the floor so that the floor can be positioned on the second structural component for fastening to the second structural component.

14 Claims, 16 Drawing Sheets

(51) Int. Cl.
*E04B 1/26* (2006.01)
*F16B 15/00* (2006.01)
*E04B 7/04* (2006.01)
*F16B 7/04* (2006.01)

(52) U.S. Cl.
CPC .......... *F16B 15/00* (2013.01); *F16B 15/0046* (2013.01); *E04B 1/2608* (2013.01); *E04B 2001/2684* (2013.01)

(58) Field of Classification Search
USPC .......... 52/262, 741.1, 741.14, 741.15, 742.1, 52/742.13, 742.14, 698, 514, 514.5, 699, 52/700, 701, 702, 703, 706, 707, 708
See application file for complete search history.

(56) References Cited

U.S. PATENT DOCUMENTS

| | | | | |
|---|---|---|---|---|
| 2,970,676 A * | 2/1961 | Maciunas | E04B 1/24 | 52/207 |
| 3,000,145 A * | 9/1961 | Fine | E04B 1/41 | 403/346 |
| 3,256,030 A * | 6/1966 | Banse | E04B 1/2608 | 248/300 |
| 3,422,585 A * | 1/1969 | Dismukes | E02D 27/32 | 249/219.1 |
| 3,423,898 A | 1/1969 | Tracy et al. | | |
| 4,038,796 A * | 8/1977 | Eckel | E04B 2/721 | 52/220.7 |
| 4,498,801 A * | 2/1985 | Gilb | E04B 1/2612 | 403/189 |
| 4,964,253 A * | 10/1990 | Loeffler | E04B 7/06 | 403/232.1 |
| 5,307,603 A * | 5/1994 | Chiodo | E04B 1/2608 | 52/297 |
| 5,380,116 A * | 1/1995 | Colonias | E04B 1/2608 | 403/170 |
| 5,442,887 A * | 8/1995 | Welsh | E04B 7/045 | 52/713 |
| 5,481,844 A * | 1/1996 | Kajita | E04B 1/0007 | 52/702 |
| 5,570,549 A * | 11/1996 | Lung | E04C 5/125 | 403/306 |
| 5,699,639 A * | 12/1997 | Fernandez | E04B 7/045 | 52/295 |
| 5,722,807 A * | 3/1998 | Hodge | F16B 31/028 | 411/10 |
| 5,864,999 A * | 2/1999 | Wallin | E02D 29/02 | 52/250 |
| 6,073,414 A | 6/2000 | Garris et al. | | |
| 6,213,679 B1 * | 4/2001 | Frobosilo | E04B 2/82 | 403/14 |
| 6,260,402 B1 * | 7/2001 | Leek | B21D 5/0209 | 72/335 |
| 6,295,780 B1 * | 10/2001 | Thompson | E04B 1/2608 | 52/702 |
| 6,523,321 B1 * | 2/2003 | Leek | E04B 1/2612 | 52/289 |
| 6,560,943 B1 * | 5/2003 | Leek | E04B 7/045 | 52/295 |
| 6,799,407 B2 * | 10/2004 | Saldana | E04B 1/2403 | 52/655.1 |
| 6,837,019 B2 | 1/2005 | Collie | | |
| 6,931,813 B2 * | 8/2005 | Collie | E04B 7/063 | 52/702 |
| 7,124,550 B1 * | 10/2006 | Deming | E04B 1/4157 | 52/127.2 |
| 7,316,098 B1 * | 1/2008 | Sackett | E04B 7/045 | 52/712 |
| 7,398,620 B1 * | 7/2008 | Jones | E04B 7/045 | 52/643 |
| 7,448,171 B1 * | 11/2008 | diGirolamo | E04B 7/045 | 248/215 |
| 7,448,178 B2 * | 11/2008 | Visone | E04B 1/2612 | 428/582 |
| 7,520,102 B1 * | 4/2009 | diGirolamo | E04B 1/4157 | 52/293.1 |
| 7,712,283 B2 | 5/2010 | Gadd et al. | | |
| 7,971,410 B2 * | 7/2011 | Jerke | E04B 7/045 | 52/702 |
| 8,458,973 B1 * | 6/2013 | Powers, Jr. | E04C 3/20 | 249/19 |
| 8,555,592 B2 * | 10/2013 | Daudet | E04B 1/2403 | 52/489.1 |
| 8,720,154 B1 * | 5/2014 | Horne | E04B 1/24 | 52/236.3 |
| 8,959,849 B1 * | 2/2015 | DiGirolamo | E04B 5/10 | 52/182 |
| 8,978,339 B2 * | 3/2015 | Doupe | E04B 1/38 | 52/702 |
| 9,091,056 B2 * | 7/2015 | Stauffer | E04B 1/40 | |
| 2001/0002524 A1 * | 6/2001 | Espinosa | E04C 5/08 | 52/293.3 |
| 2002/0112438 A1 | 8/2002 | Little | | |
| 2003/0079428 A1 * | 5/2003 | Rivers | E04B 1/24 | 52/270 |
| 2003/0093969 A1 * | 5/2003 | Saldana | E04B 1/2403 | 52/715 |
| 2005/0011157 A1 * | 1/2005 | Lutz | E04B 7/045 | 52/698 |
| 2005/0120669 A1 | 6/2005 | Harrison | | |
| 2005/0155315 A1 * | 7/2005 | Davis | E04B 7/045 | 52/712 |
| 2006/0059794 A1 * | 3/2006 | Gilstrap | E04B 7/045 | 52/90.1 |
| 2006/0150564 A1 * | 7/2006 | Dufault | E04B 7/045 | 52/702 |
| 2008/0148655 A1 * | 6/2008 | Posey | E04B 1/26 | 52/92.2 |
| 2008/0282641 A1 * | 11/2008 | Sackett | E04B 7/045 | 52/715 |
| 2009/0049790 A1 * | 2/2009 | Sinclair | E04B 7/045 | 52/702 |
| 2009/0094931 A1 * | 4/2009 | Sanders | E04B 1/41 | 52/698 |
| 2010/0058681 A1 * | 3/2010 | Lucey | E04B 1/2604 | 52/167.3 |
| 2010/0162638 A1 * | 7/2010 | Hunt | E04B 7/045 | 52/92.2 |
| 2017/0204600 A1 * | 7/2017 | Daudet | E04B 1/2403 | |

* cited by examiner

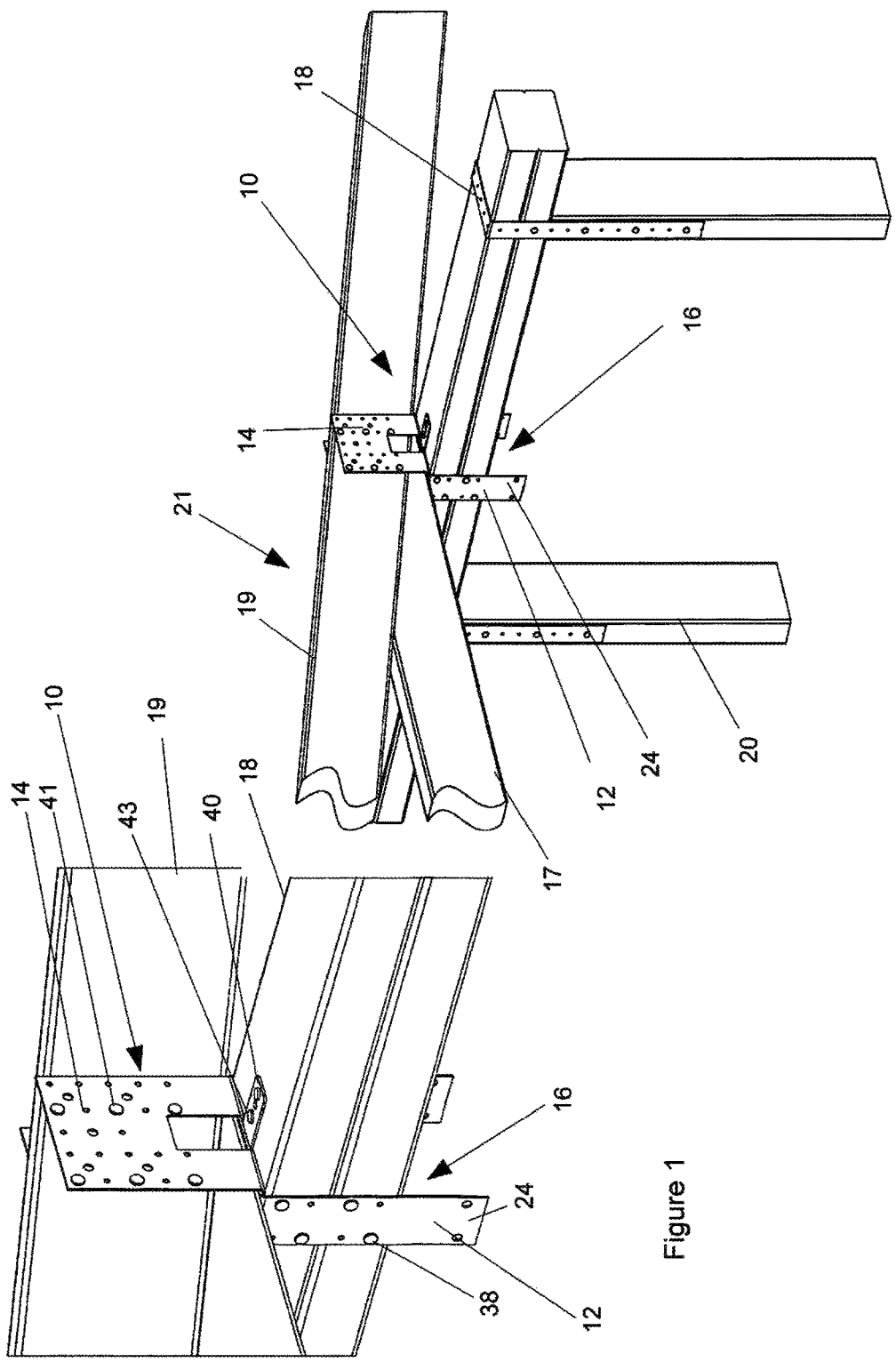

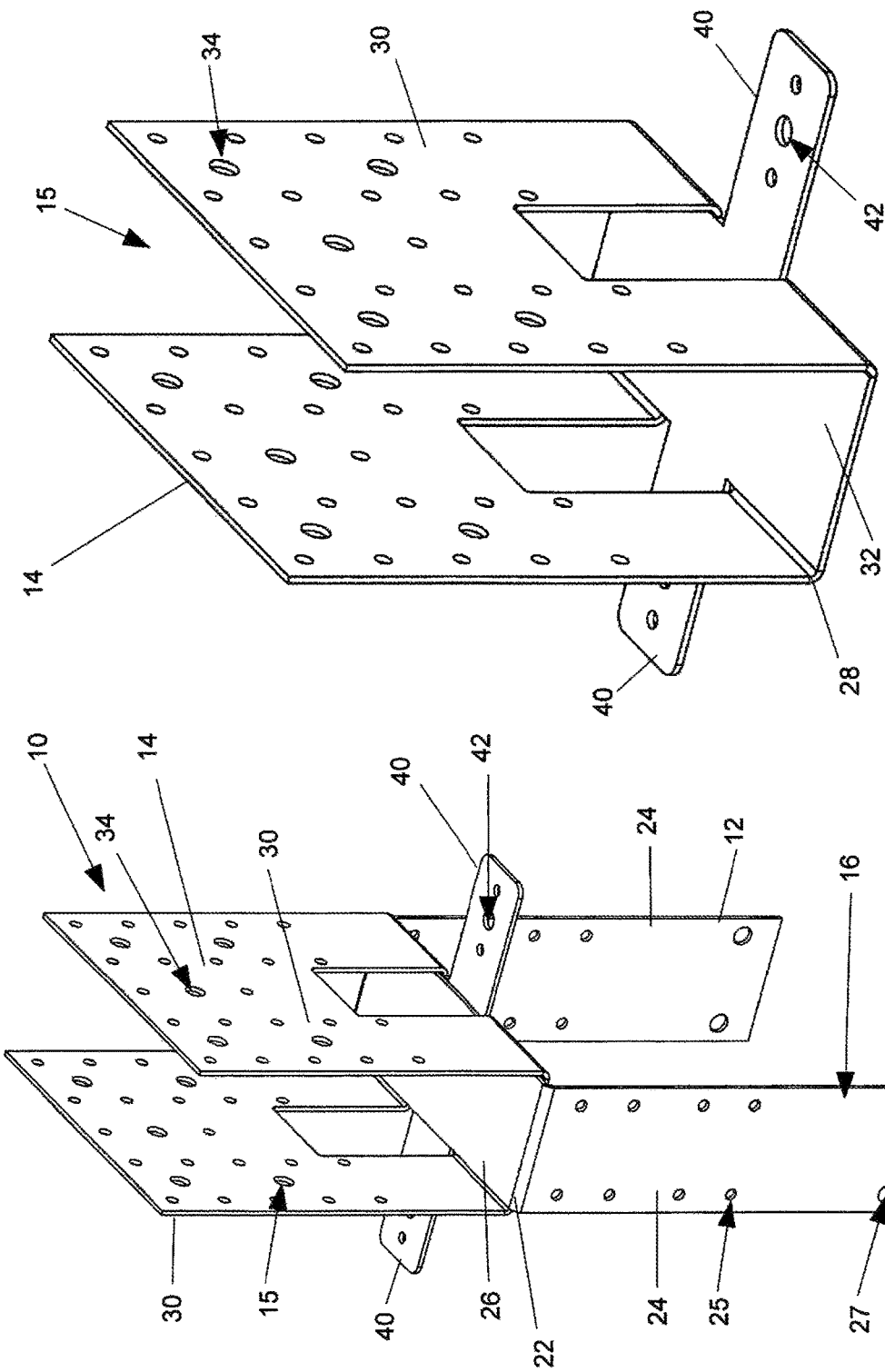

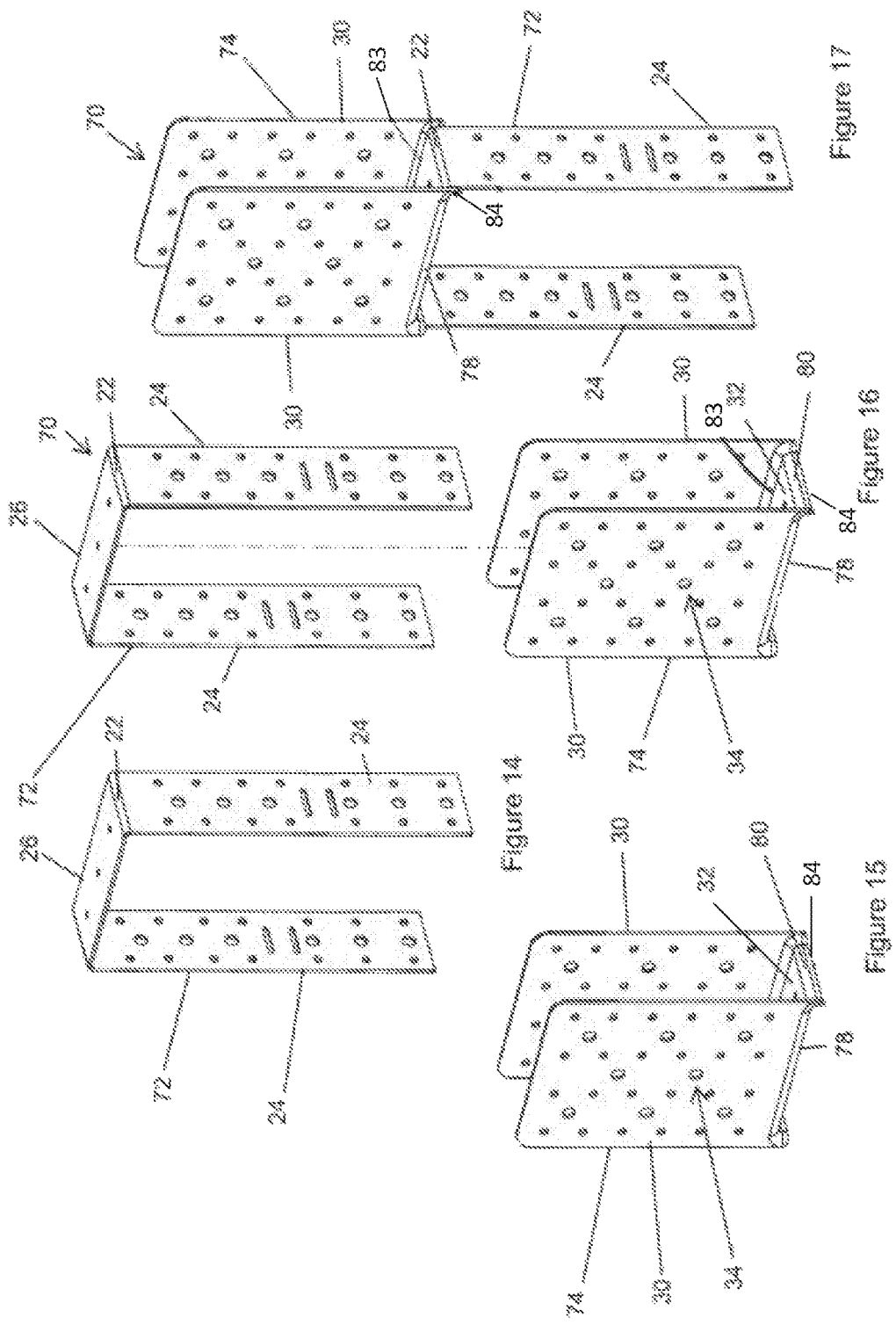

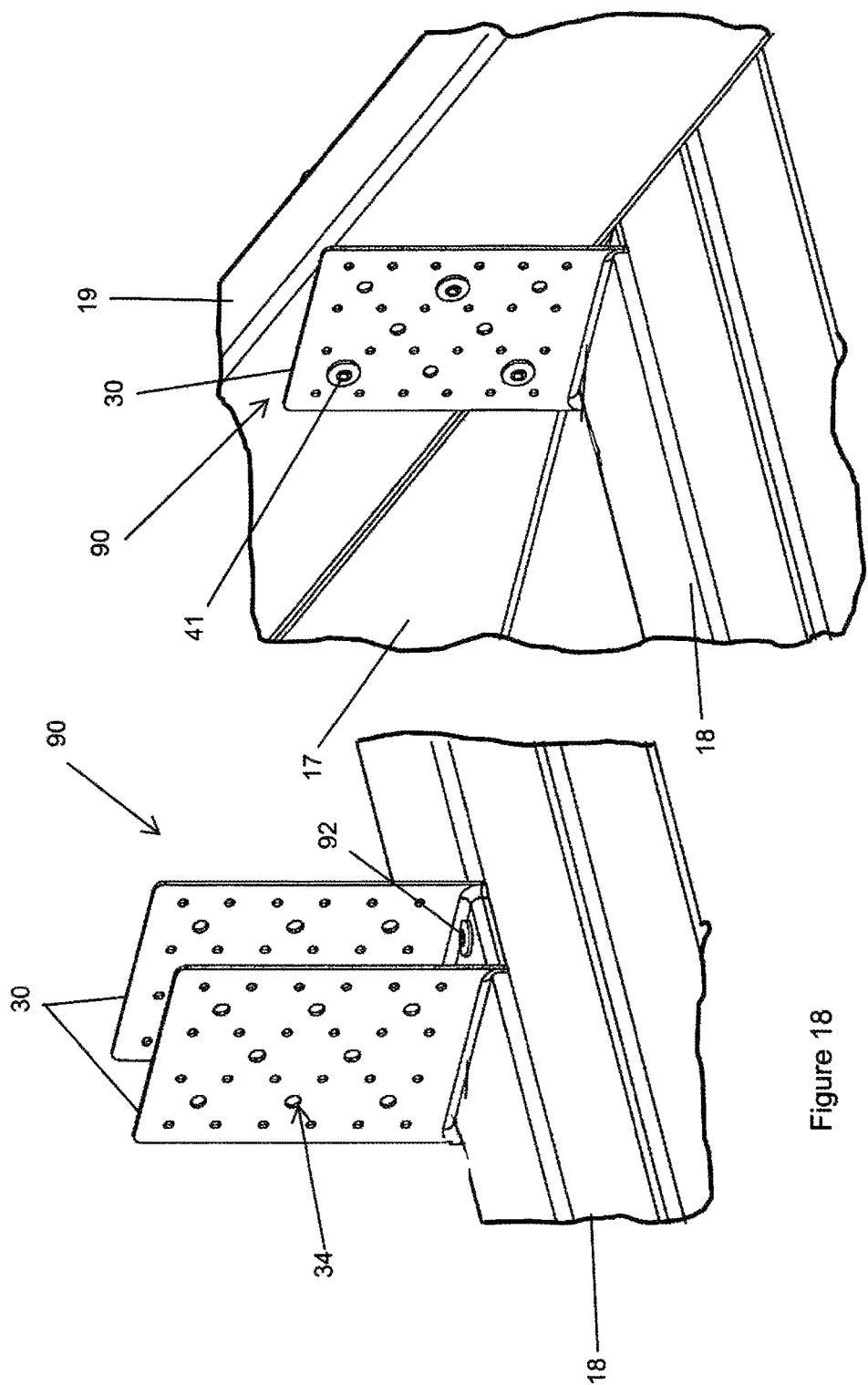

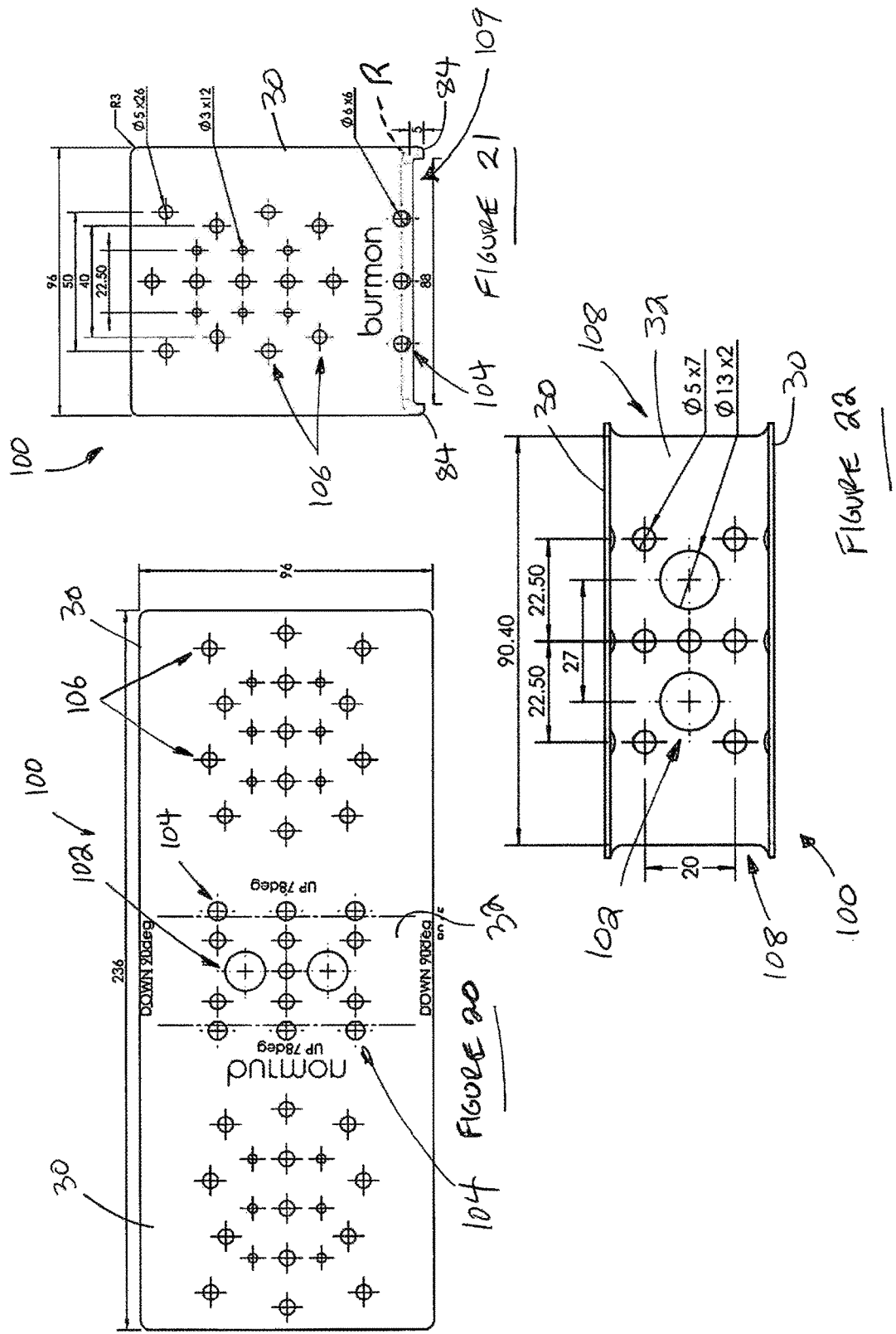

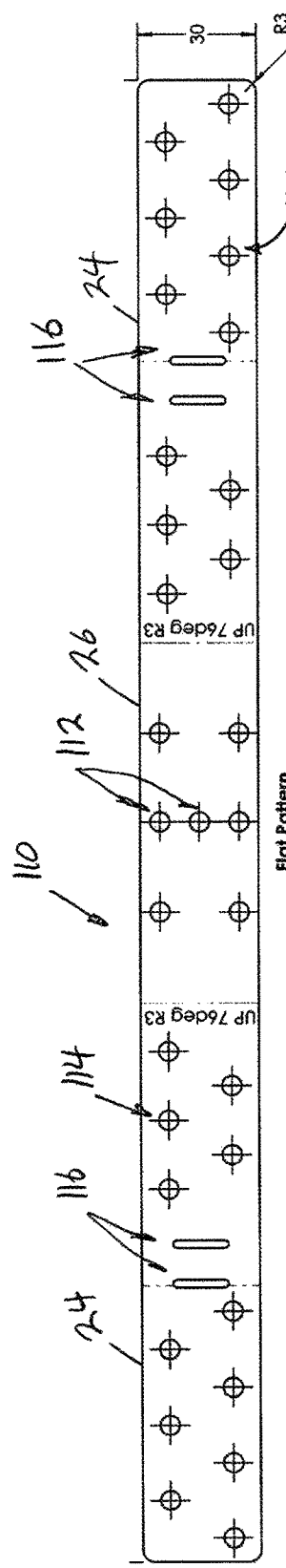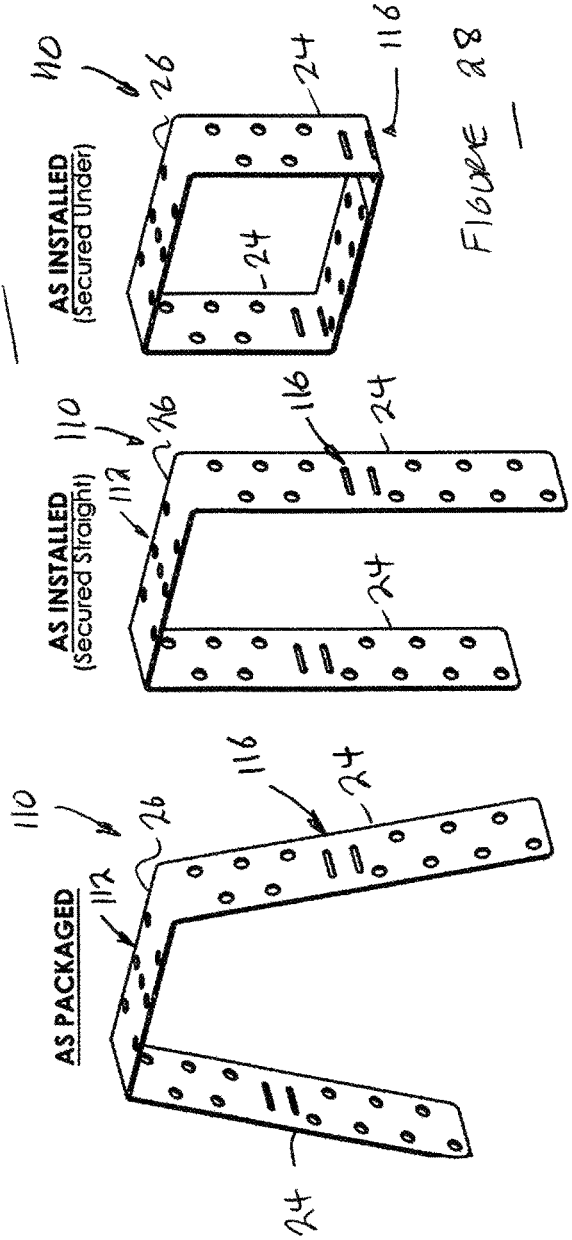

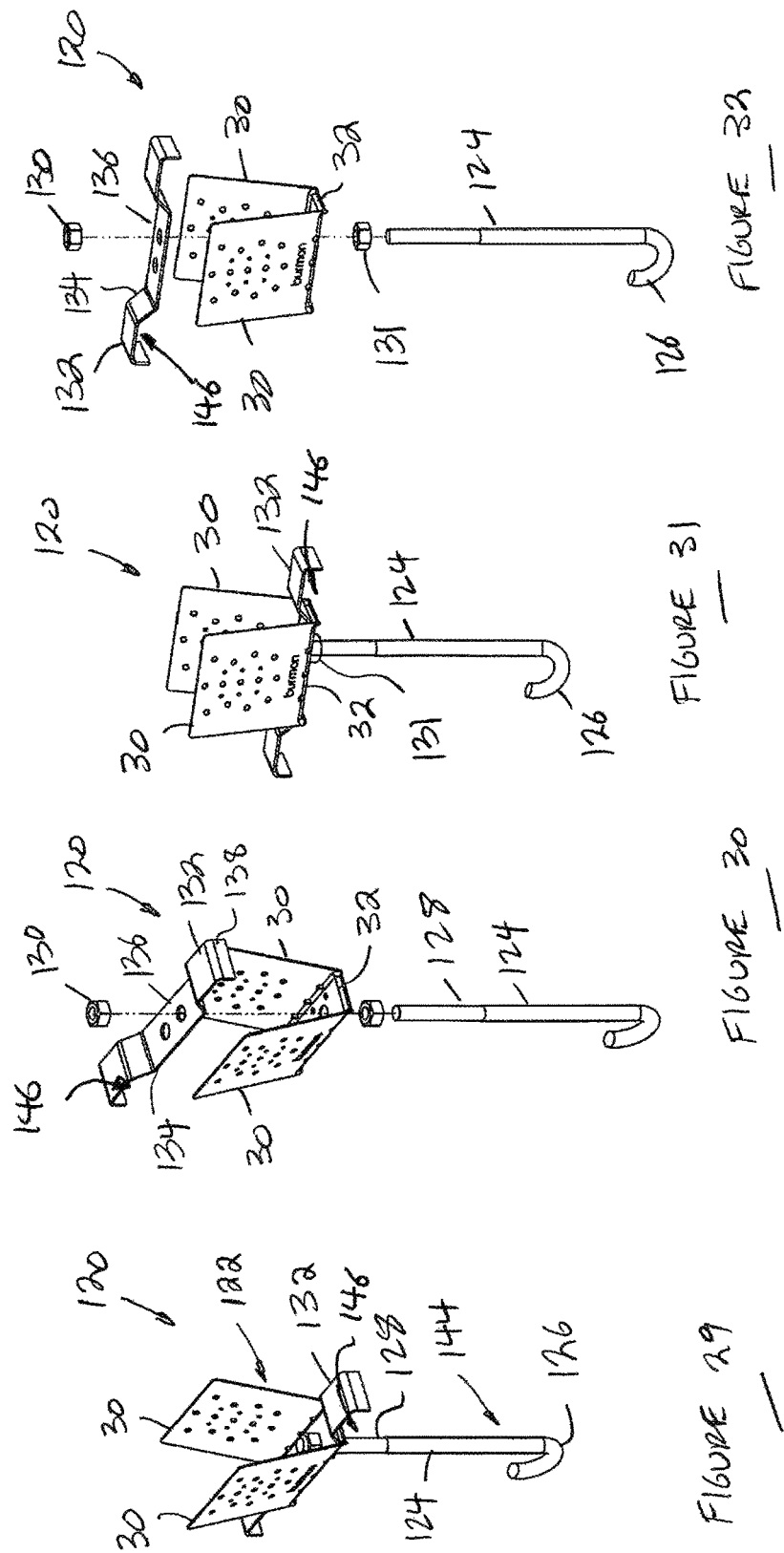

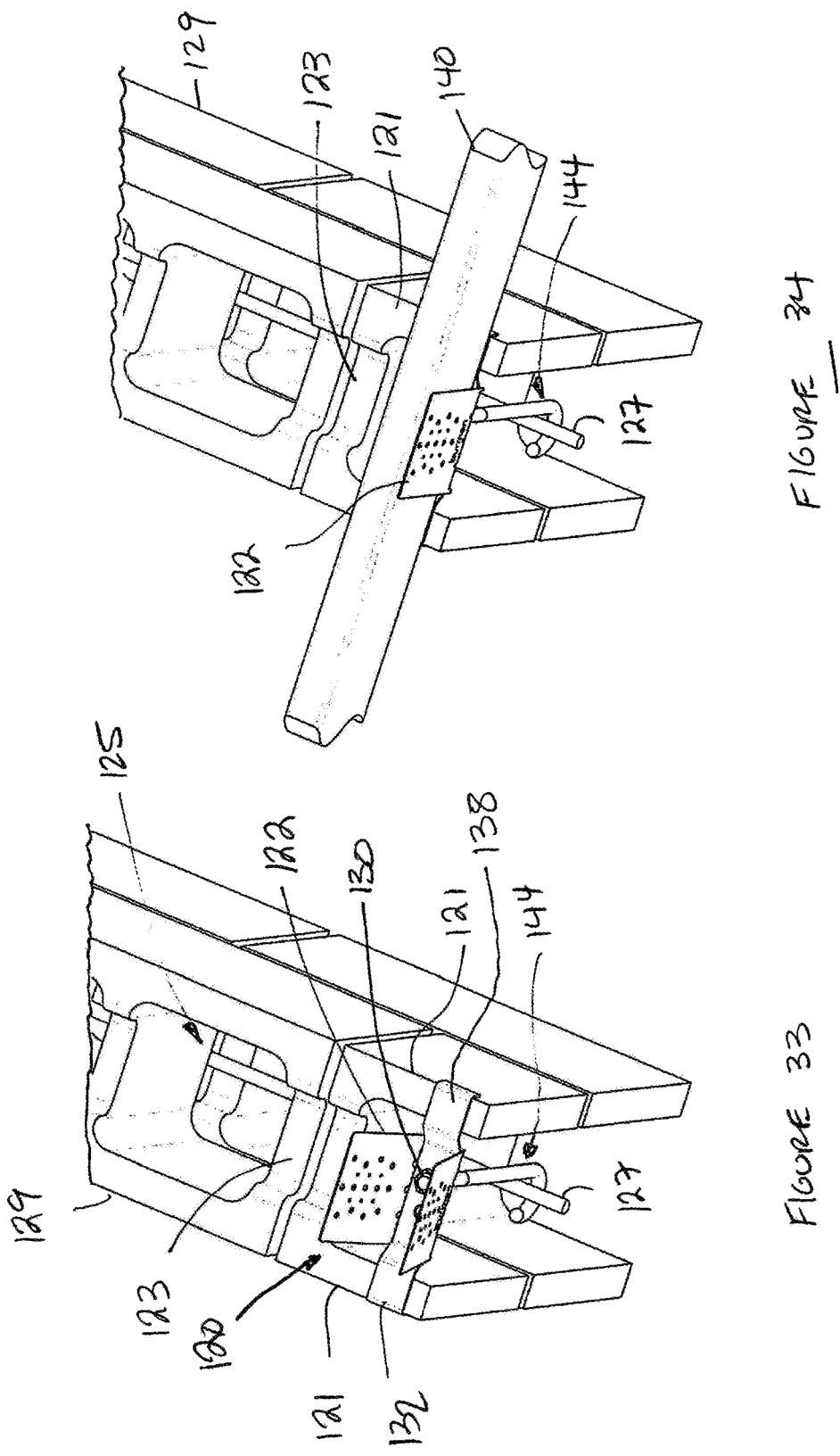

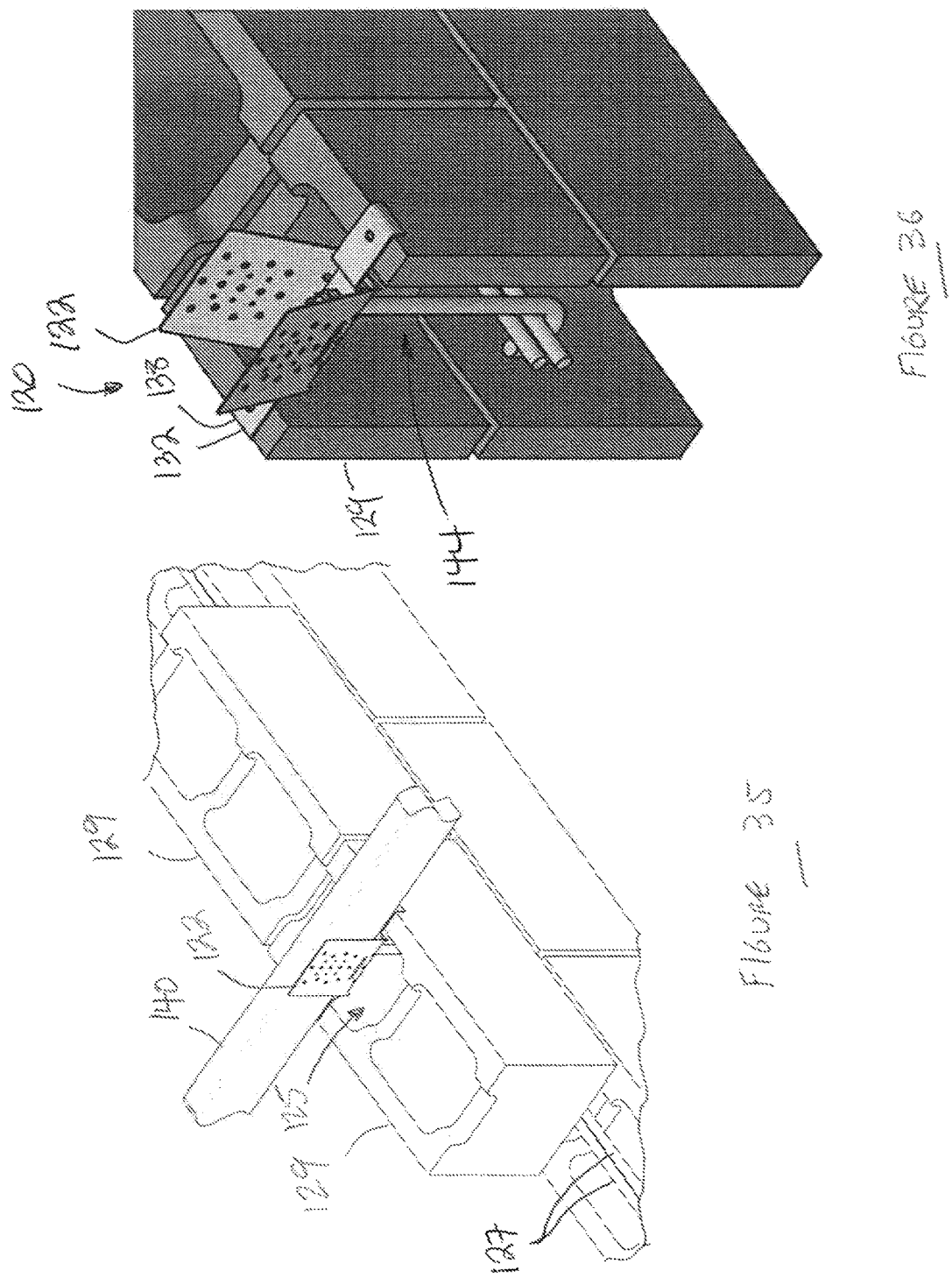

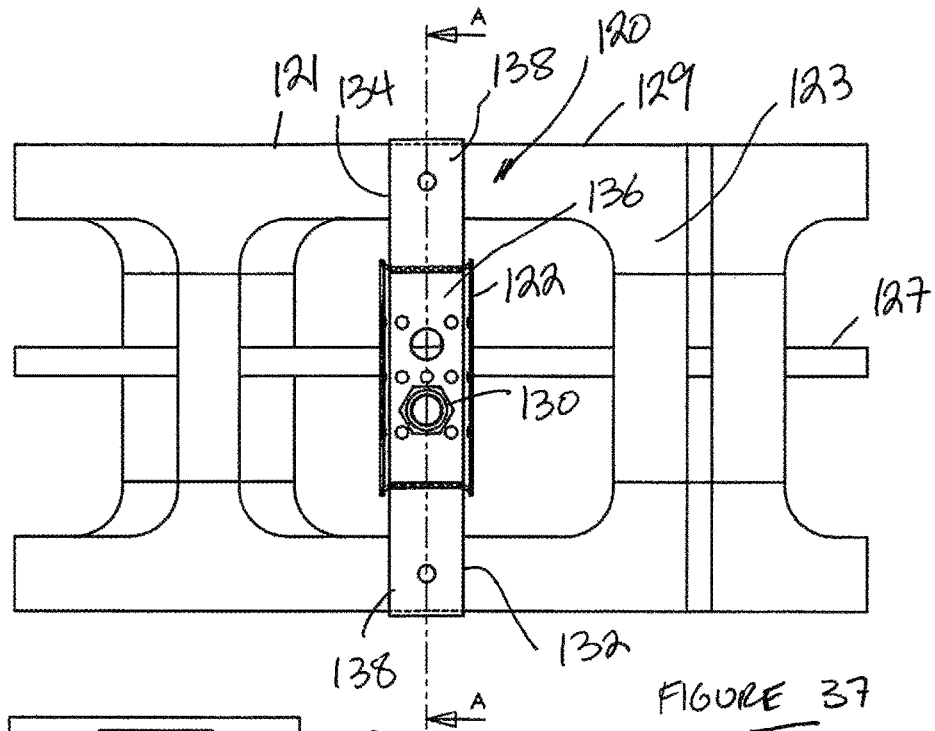
FIGURE 37
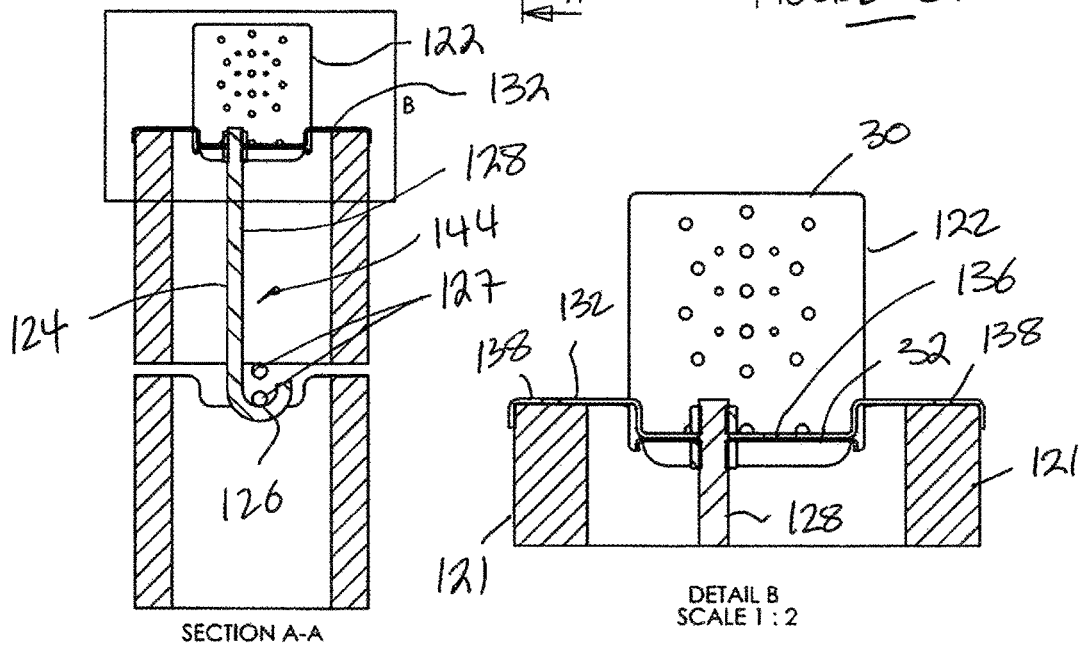
FIGURE 38
FIGURE 39

STRUCTURAL CONNECTOR

FIELD

Various exemplary embodiments of a structural connector and a fastening assembly are described herein.

SUMMARY

Various exemplary embodiments of a structural connector for fastening structural components together comprise a floor;

two spaced sidewalls extending from respective sides of the floor, the floor and the sidewalls defining a channel in which a first of the structural components can be received, the sidewalls being configured so that the sidewalls can be fastened to the first structural component; and a positioning arrangement that is operatively arranged with respect to the floor so that the floor can be positioned on the second structural component for fastening to the second structural component.

The positioning arrangement may be configured so that the floor can be positioned on the second structural component in the form of an upper wall structure such as a top edge of a wall, such as a block wall, or an upper wall member or top plate of a wall frame.

The positioning arrangement may be provided by the floor having an external profile that is shaped so that the floor can be positioned on, and nest with, the upper wall structure.

The floor may define at least one opening so that the floor can be fastened to the upper wall structure by a fastener received through the, or each, opening.

The sidewalls and floor may be configured so that the first structural component can be received between the sidewalls, generally orthogonally with respect to the second structural component and fastened to the sidewalls.

The floor may be generally rectangular with a pair of opposed end portions oriented generally orthogonally with respect to the sides of the floor. Each of the end portions may be shaped to define a lip that projects or depends from a plane of the floor, oppositely to the sidewalls. The lips may each have a curved profile in a plane that is orthogonal with respect to the floor and the end portions.

A junction between the sidewalls and the floor may also be curved.

The first structural component may be a joist and rafter of a truss assembly that can be received between the sidewalls.

The positioning arrangement may include a carrier that is fastened to the floor. The carrier may be configured to engage upper edges of opposed sidewalls of the second structural component in the form of a hollow block of a block wall and so to support the floor and the sidewalls between the sidewalls of the second structural component.

The carrier may be in the form of an elongate, generally rectangular metal plate that can be received between the sidewalls so that a central portion overlies the floor and end portions bear against the upper edges of the opposed sidewalls of the second structural component.

The end portions may be shaped to correspond with the opposed sidewalls so that the sidewalls can nest or clip into engagement with the carrier.

Various exemplary embodiments of a fastening assembly comprise the structural connector; and a tie-down that comprises a floor that is configured for positioning on the floor of the structural connector; and two spaced sidewalls extending from respective sides of the floor, the floor and the sidewalls defining a channel that opens oppositely to the channel of the structural connector for receiving the second structural component and which can be connected to the second structural component.

Various exemplary embodiments of a fastening assembly comprise the structural connector; and at least one hanger that is fastened to the floor to depend from the floor, the hanger(s) being configured to support one or more reinforcing bars located within the block wall.

The hanger(s) may be in the form of an elongate rod that defines a hook into which the reinforcing bars can be hooked and a threaded shank that is received through an opening in the floor and fastened to the floor with one or more nuts threaded on to the shank.

Various exemplary embodiments of a method of fastening structural components together comprise the steps of:

fastening the floor of the connector to a structural component; and fastening another structural component between the sidewalls of the connector.

Various exemplary embodiments of a structural assembly are a product of the method as claimed in claim 15.

Various exemplary embodiments of a structural connector comprise a tie-down that defines a channel for receiving one or more building components and which can be connected to the one or more building components; and a structural connector arranged on a floor of the tie-down and defining a channel that opens oppositely to the channel of the tie-down for receiving one or more building components and which can be connected to the one or more building components to which the tie-down can be connected.

It follows that the first and structural connectors define a fastening assembly for fastening the building components together.

The structural connector may define a seating formation so that the structural connector can be seated on said one or more building components to which the tie-down can be connected.

The tie-down may be adapted for receiving an upper wall structure, such as a top edge of a wall or an upper wall or top plate of a wall frame. The structural connector may be adapted for receiving one or more beams. In particular, the structural connector may be adapted for receiving a joist and a rafter of a truss assembly.

The tie-down and the structural connector may be formed in a bending or folding operation from metal plate. For example, they may be formed from galvanised steel and/or stainless steel plate.

The tie-down may include a pair of opposed sidewalls. Each sidewall may extend from a respective side of the floor. The sidewalls may define openings so that they can be connected to the upper wall structure. In particular, the sidewalls may define openings so that they can be nailed or screwed to the upper wall structure.

The tie-down may be formed from an elongate strip of metal that is bent transversely at junctions between the floor and the sidewalls.

The structural connector may be formed from a plate of metal that is bent at junctions between a floor and a pair of sidewalls. Each sidewall may extend from a respective side of the floor.

The floor of the tie-down may be dimensioned to be received between the sidewalls of the structural connector to overlie the floor of the structural connector. Thus, when the tie-down is fastened to the support structure, the structural connector is secured to the support structure.

The floor of the structural connector may be shaped to have an outer surface that corresponds to that of the upper wall structure so that the floor and upper wall structure can nest.

The sidewalls of the structural connector may define openings so that they can be fastened to the component(s) with nails or screws received through the openings. A fastening tab or lug may extend from each sidewall of the structural connector. The fastening tabs may define openings so that they can be secured to the upper wall structure. The fastening tabs can serve to secure a number of the structural connectors to the top plate in predetermined locations for the joists and rafters. Thus, the structural connector can serve as a positioning device for truss assemblies during set out of a roof installation.

Various exemplary embodiments of a method of connecting building components together use the structural connector described above.

Various exemplary embodiment of a structural connector for fastening building components together comprise
 a floor; and
 two spaced sidewalls extending from respective sides of the floor, the floor and the sidewalls defining a channel in which one of the building components can be received, the sidewalls being configured so that the sidewalls can be fastened to said one of the building components and the floor being configured to be fastened to another of the building components.

The floor may have an external profile that defines a seat so that the floor can be seated on said another of the building components.

The external profile may be shaped so that the seat can be positioned on and nest with an upper wall structure such as a top edge of a wall or an upper wall or top plate of a wall frame.

The floor may define at least one opening so that the floor can be fastened to the upper wall structure by a fastener received through the, or each, opening.

The sidewalls and floor may be configured so that at least one beam can be received between the sidewalls, generally orthogonally with respect to the upper wall structure and fastened to the sidewalls.

A joist and rafter of a truss assembly can be received between the sidewalls.

Various exemplary embodiments of a method of fastening building components together comprise the steps of:
 fastening the floor of a structural connector of the third aspect of the invention to a building component; and
 fastening another building component between the sidewalls of the connector.

BRIEF DESCRIPTION OF THE DRAWINGS

FIG. 1 shows one view of an exemplary embodiment of a structural connector and a fastening assembly, in use.

FIG. 2 shows another view of the structural connector and the fastening assembly, in use.

FIG. 5 shows a three-dimensional view of the tie-down mounted on the structural connector.

FIG. 6 shows a three-dimensional view of the structural connector of FIG. 1.

FIG. 14 shows an exemplary embodiment of a tie-down of the fastening assembly.

FIG. 15 shows an exemplary embodiment of a structural connector.

FIG. 16 shows an exploded view of a fastening assembly including the structural connector.

FIG. 17 shows an operative view of the fastening assembly.

FIG. 18 shows an exemplary embodiment of a structural connector attached to an upper wall structure.

FIG. 19 shows a truss assembly connected between sidewalls of the structural connector of FIG. 18.

FIG. 20 shows a plan view of an exemplary embodiment of a structural connector, in a flattened, pre-folded form.

FIG. 21 shows a side of the structural connector of FIG. 20, in an operative form.

FIG. 22 shows a plan view from above of the structural connector of FIG. 21.

FIG. 25 shows a plan view of an exemplary embodiment of a tie-down in a flattened, pre-folded form.

FIG. 26 shows a three dimensional view of the tie-down, in a packaged form.

FIG. 27 shows a three dimensional view of the tie-down, in an installed or operative form.

FIG. 28 shows a three dimensional view of the tie-down, in a further, installed form.

FIG. 29 shows a three dimensional view of a further exemplary embodiment of a fastening assembly.

FIG. 30 shows an exploded view of the fastening assembly of FIG. 29.

FIG. 31 shows another three dimensional view of the fastening assembly of FIG. 29.

FIG. 32 shows another exploded view of the fastening assembly of FIG. 29.

FIG. 33 shows the fastening assembly of FIG. 29, mounted on a block wall structure, prior to fastening a beam to the block wall structure.

FIG. 34 shows the fastening assembly of FIG. 29, in use.

FIG. 35 shows another view of the fastening assembly of FIG. 29, in use.

FIG. 36 shows another view of the fastening assembly of FIG. 29, prior to fastening the beam to the block wall structure.

FIG. 37 shows a plan view of the fastening assembly, in use.

FIG. 38 shows a sectioned view, through A-A in FIG. 37, of the fastening assembly, in use.

FIG. 39 shows a sectioned view, of detail B in FIG. 28.

DETAILED DESCRIPTION

Figure 4:
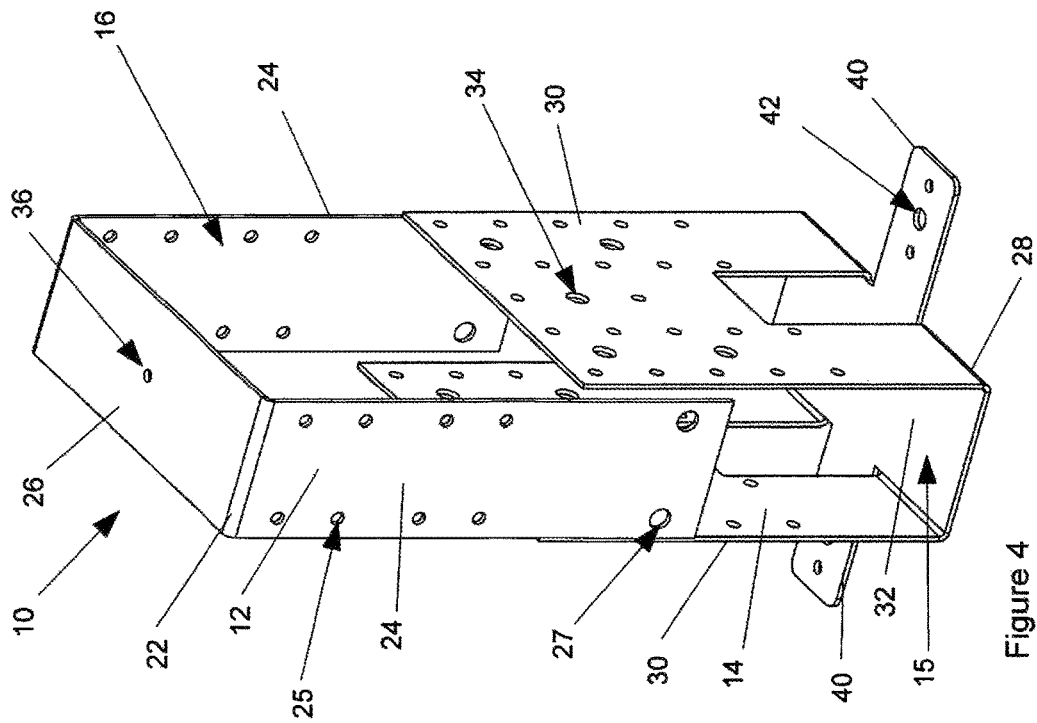
FIG. 4 shows a three-dimensional view of the fastening assembly indicating a manner in which a tie-down of the fastening assembly engages the structural connector.

In the drawings, reference numeral 10 generally indicates an exemplary embodiment, according to the invention, of a fastening assembly.

The structural connector 10 includes a tie-down 12 and a structural connector 14.

The tie-down 12 defines a channel 16 that is adapted for receiving one or more building components and for fastening to the one or more building components. In this example, the tie-down 12 is adapted for receiving an upper wall structure in the form of a top plate 18 of a wall frame 20.

The structural connector 14 defines a channel 15. The channel 15 is adapted for receiving beams in the form of bottom and top chords or a joist 17 and a rafter 19 of a truss assembly 21.

The tie-down 12 is formed from a strip of metal, in this example, a strip of galvanised steel or stainless steel. It is envisaged that the tie down 12 could also be formed of other materials, if appropriate. The strip of galvanised steel is bent or formed at transverse junctions 22 to define a pair of opposed sidewalls 24 and a floor 26 so that the sidewalls 24 extend from opposite ends of the floor 26. The sidewalls 24 extend generally orthogonally with respect to the floor 26 so that the top plate 18, conventionally having a rectangular profile, can be received snugly between the sidewalls 24.

Figure 10:
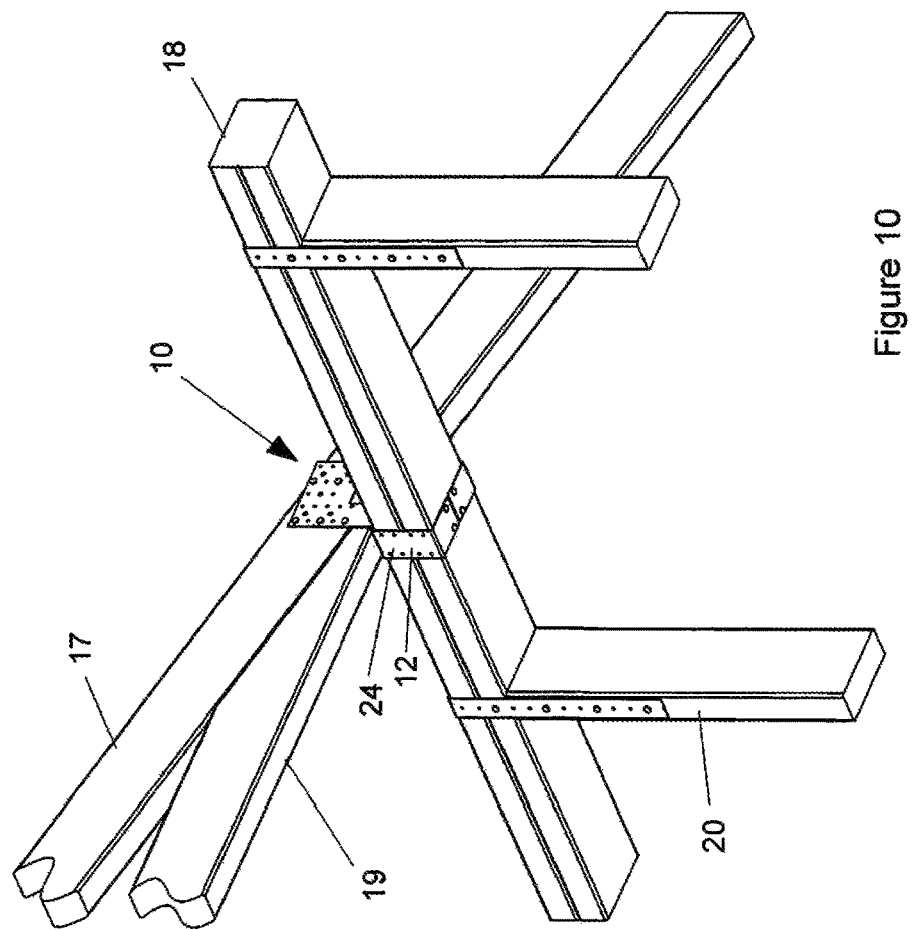
FIG. 10 shows another view of the application shown in FIG. 9.
Figure 9:
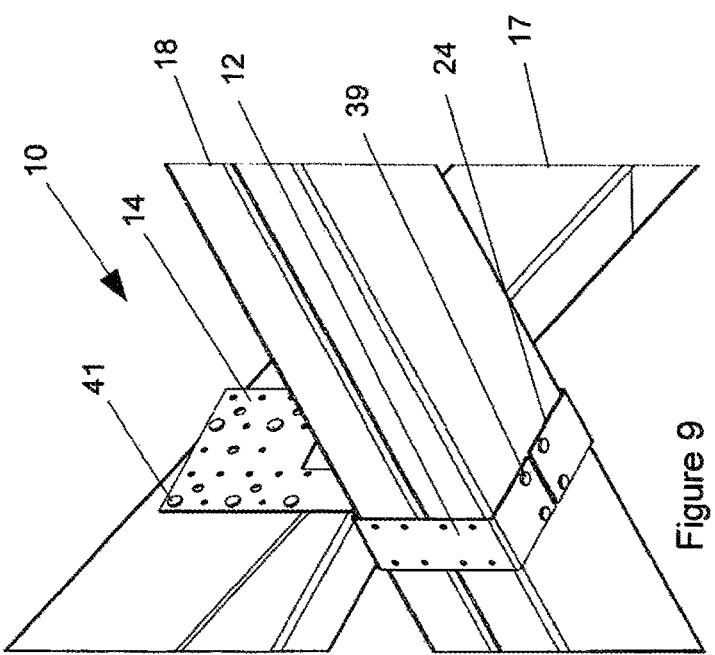
FIG. 9 shows one application of exemplary embodiments of the structural connector and the tie-down.

The sidewalls 24 each define openings 25 so that they can be screwed or nailed to sides of the top plate 18. The sidewalls 24 can also each be wrapped under the top plate 18 and screwed or nailed to the top plate 18 from underneath the top plate 18 as shown in FIGS. 9 and 10. To that end, the sidewalls 24 define a pair of openings 27 so that the sidewalls 24 can be secured to an underside of the top plate 18 with suitable fasteners 39.

The structural connector 14 is formed from a plate of metal, in this example, a plate of galvanised steel or stainless steel. However, it is envisaged that the connector 14 could be moulded or otherwise fabricated from a different material such as a plastics material, including a reinforced plastics material.

The plate is formed or bent to be curved at junctions 28 to define a pair of opposed sidewalls 30 and a floor 32 so that the sidewalls 30 extend from opposite sides of the floor 32. The sidewalls 30 extend generally orthogonally with respect to the floor 32, when in use. They can diverge when not in use, to facilitate packaging, one on top of the other.

The sidewalls 30 each define openings 34 so that the sidewalls 30 can be fastened to the joist 17 and rafter 19 to secure those components in the channel 15. The fastening can be by way of screwing or nailing.

As can be seen in FIG. 5, the floor 26 of the tie-down 12 corresponds generally with the floor 32 of the structural connector 14 so that the channel members 12, 14 can engage each other in a nesting relationship.

Each sidewall 30 of the structural connector 14 defines a lug or tab 40 extending outwardly from the channel 15 and generally aligned with the floor 32. The tab 40 is formed by culling or stamping out a portion of the associated sidewall 30 and folding the portion so that it extends generally coplanar with the floor 32. It is envisaged that the tab 40 could be formed in other ways, for example, in a moulding process together with the remainder of the connector 14.

The tab 40 defines openings 42 so that it can be nailed or screwed to the top plate 18, thus securing the structural connector 14 to the top plate 18. The inventor(s) envisages that the tab 40 is optional in that it can be used to position and secure the channel member 14. Alternatively, the channel member 14 could be fastened to the top plate 18 through the floor 32.

Figure 3:
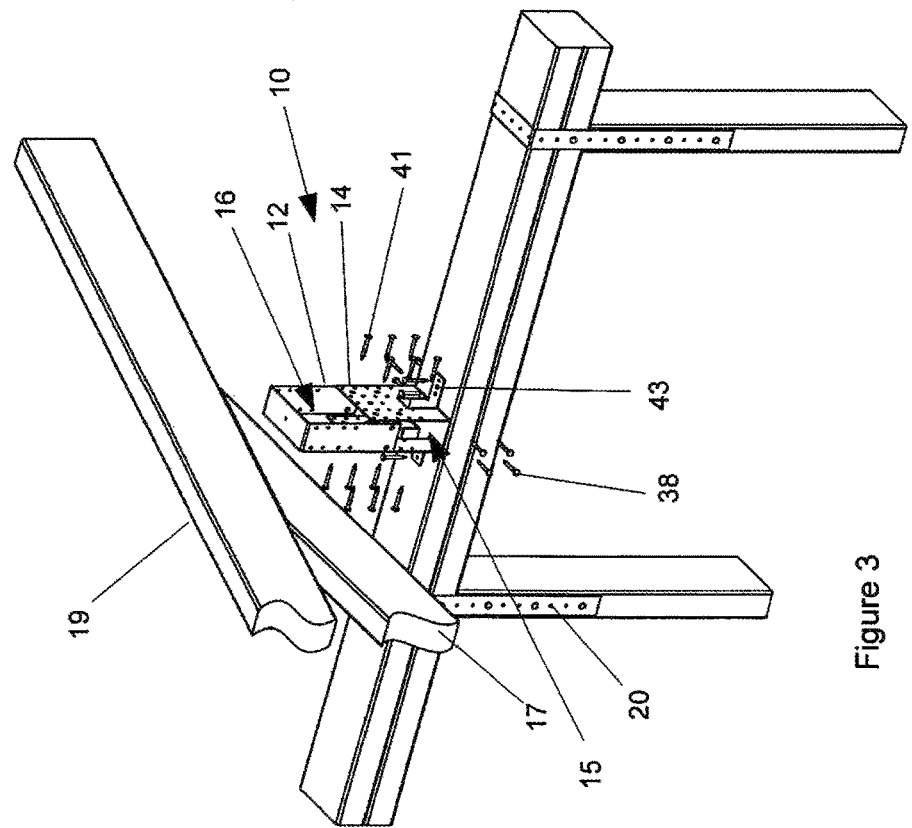
FIG. 3 shows an exploded view of the fastening assembly, in use.

Thus, as indicated in FIGS. 3 and 4, the structural connector 14 is positioned on the top plate 18. The structural connector 14 is secured to the top plate 18 using the tabs 40 in combination with suitable fasteners 43. The tie-down 12 is then placed into nesting relationship with the structural connector 14, with the floor 26 of the tie-down 12 overlying the floor 32 of the structural connector 14. The floor 26 of the tie-down 12 defines an opening 36 so that the floors 26, 32 can both be fastened to the top plate 18 with a suitable fastener, such as a screw.

The sidewalls 24 of the tie-down 12 are connected to the top plate 18 with screws 38 driven through the openings 25 and into the top plate 18. The inventor(s) envisages that nails can readily be used instead of the screws 38.

Figure 12:
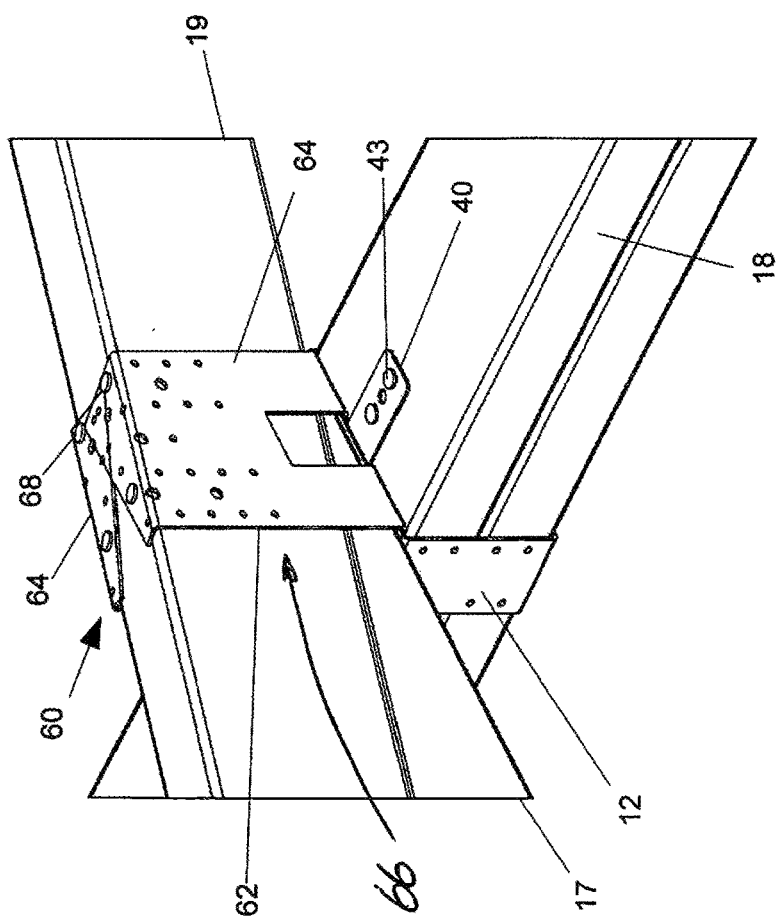
FIG. 12 shows a three dimensional view, from above, of the fastening assembly of FIG. 11.
Figure 11:
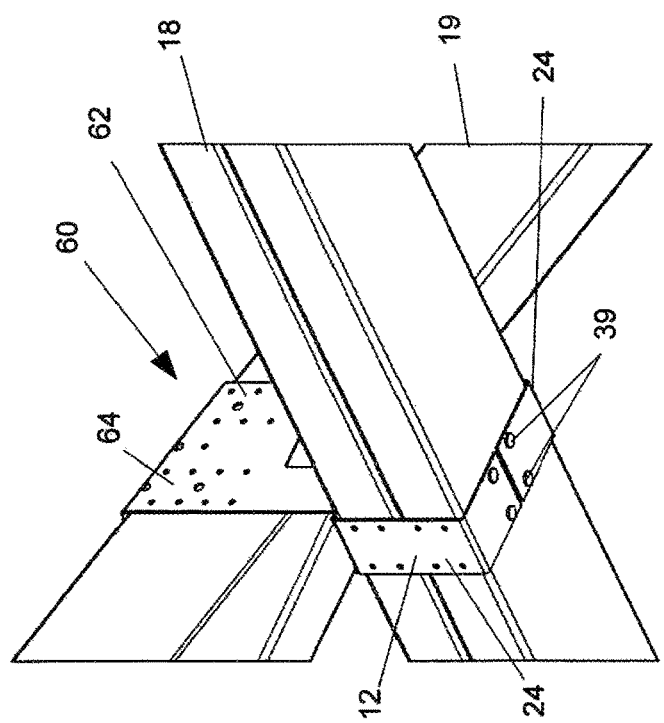
FIG. 11 shows a three dimensional view, from underneath, of an exemplary embodiment of a fastening assembly, in use.
Figure 13:
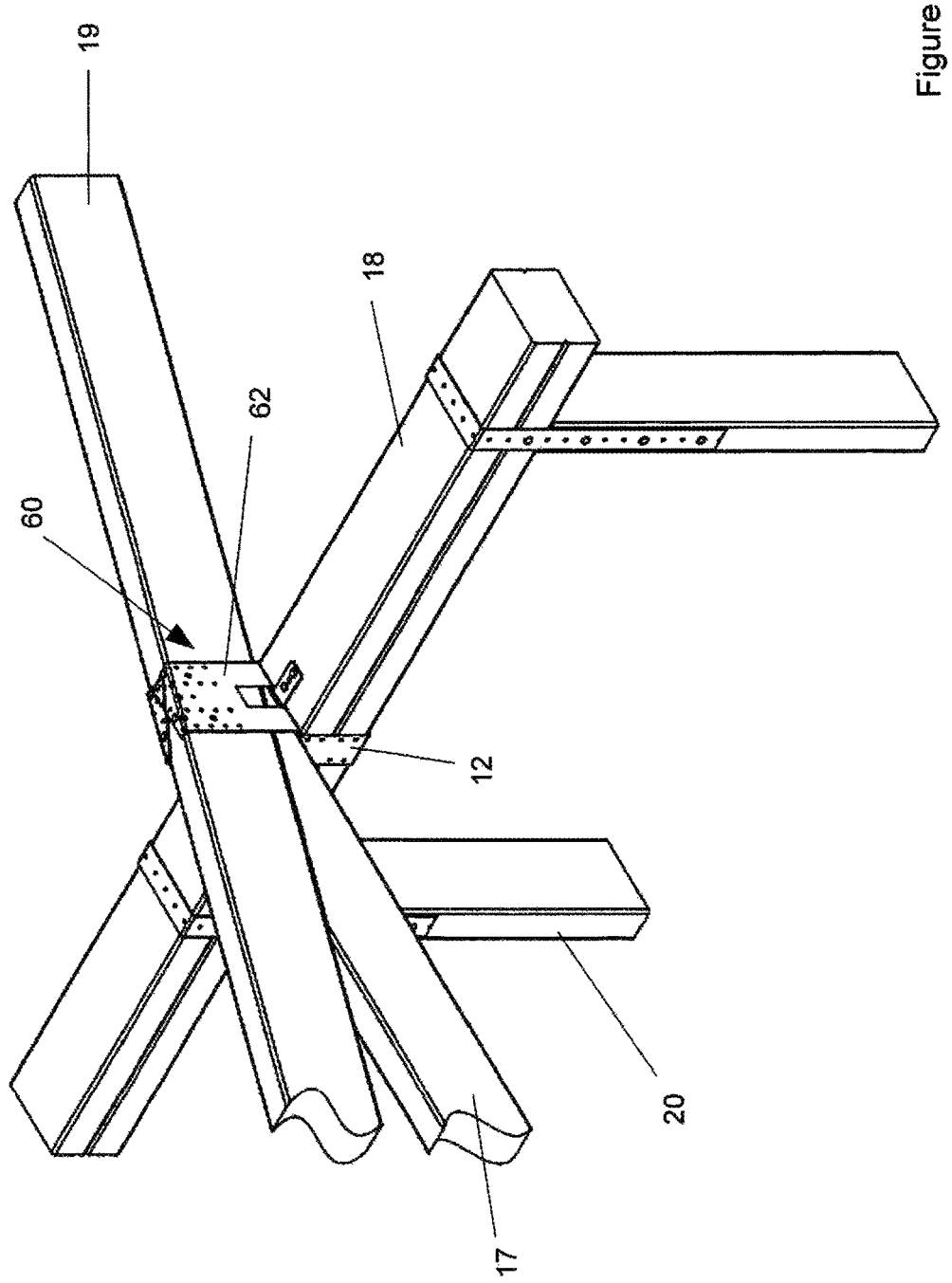
FIG. 13 shows a further three dimensional view, from above, of the fastening assembly of FIG. 11.

The truss assembly 21 is then positioned so that the overlapping regions of the joist 17 and rafter 19 are positioned in the channel 16. The sidewalls 30 of the channel member 14 are fastened to the joist and rafter 17, 19 with screws 41 screwed through the openings 34 and into the joist and rafter 17, 19. As can be seen in FIGS. 11 to 13, the sidewalls 30 can be of sufficient length to permit them to be wrapped over the truss assembly 21 and fastened to the truss assembly 21 in that condition. The inventor(s) envisages that nails can readily be used instead of the screws 41.

The completed assembly is shown in FIGS. 1 and 2.

Figure 8:
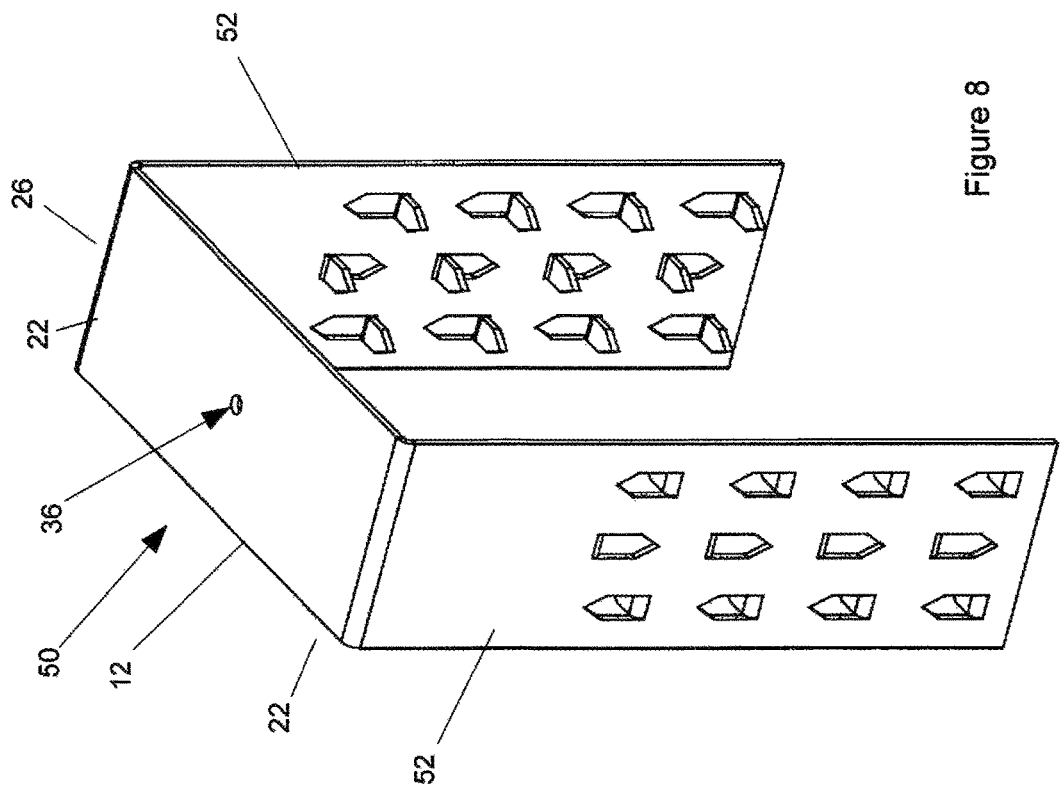
FIG. 8 shows a three-dimensional view of a further exemplary embodiment of the tie-down.
Figure 7:
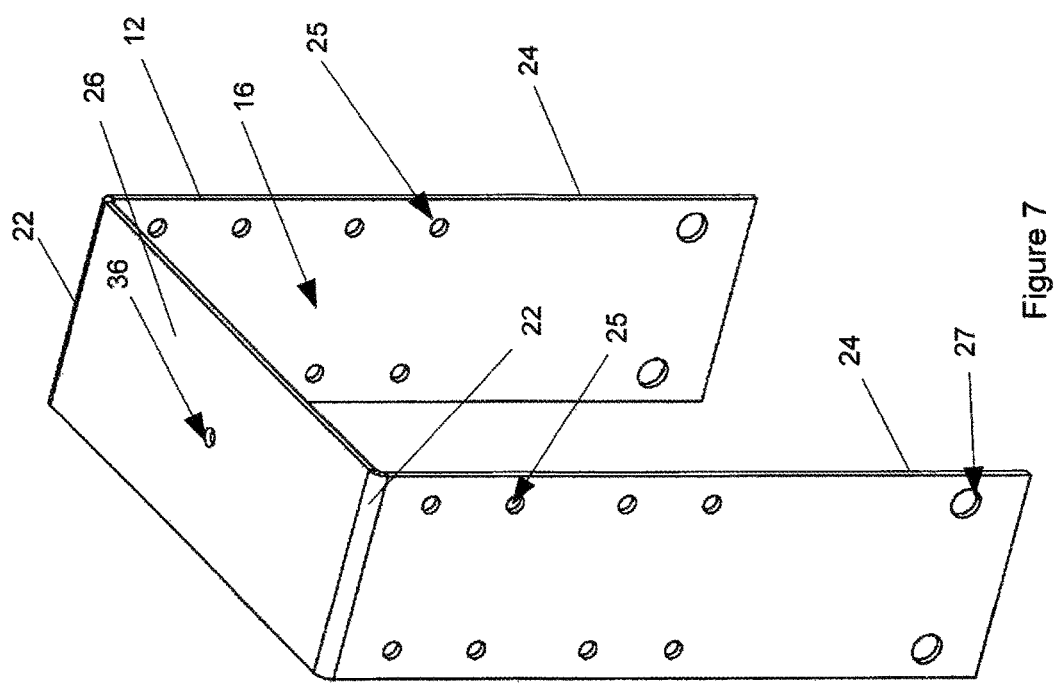
FIG. 7 shows a three-dimensional view of an exemplary embodiment of the tie-down.

In FIG. 8, reference numeral 50 generally indicates an exemplary embodiment of the tie-down, suitable for use with the assembly 10. With reference to the preceding drawings, like reference numerals refer to like parts, unless otherwise specified.

Instead of utilising openings and corresponding fasteners, the channel member 50 has a pair of sidewalls 52 that define respective gang-nail-type connectors so that the sidewalls 52 can be hammered or driven into engagement with the top plate 18. Also, the sidewalls 52 can each be wrapped under the top plate 18 and fastened in that condition if required as shown in FIGS. 9 and 10.

In FIGS. 11 to 13, reference numeral 60 generally indicates an exemplary embodiment of a fastening assembly. With reference to the preceding drawings, like reference numerals refer to like parts, unless otherwise specified. Furthermore, any characteristics or attributes described with reference to the fastening assembly 10 are to be understood as being applicable to the fastening assembly 60, and vice versa, unless otherwise specified.

The fastening assembly 60 has a structural connector 62 with sidewalls 64 that define a channel 66 in which the truss assembly 21 can be received. The sidewalls 64 have a length that is sufficient to permit the sidewalls 64 to extend over the truss assembly 21 and overlap. Thus, as can be seen in FIG. 12, the sidewalls 64 can be wrapped or bent over the rafter 19 to overlap each other and are then screwed or nailed to the rafter 19 with suitable fasteners 68.

The fastening assembly 10, 60 provides a two-part fastening system adapted to secure timber or metal roof trusses to timber or metal wall frames, for example, for dwellings. In particular, the fastening assembly 10, 60 provides a fastening system suitable for use in cyclonic and high wind conditions.

a. At present, one method of securing roof trusses to wall frames requires at least four steps. These are:
b. Setting out the positions of the roof trusses.
c. Positioning each roof truss and fixing the joist or bottom chord of each roof truss to the top plate with skew nails for all the roof trusses.
d. Fastening components, such as "multi-grips" or "triple grips" to the trusses and the top plates requires at least 10 nails to be driven through the connector into top plate and roof truss. Again, this must be repeated for all the roof trusses.
e. Installing cyclone straps. For example, a cyclone strap is a 25 mm wide strip of galvanised metal which is either about 450 mm or 600 mm or 900 mm long. Each strap is secured by passing the strap over the truss or wrapped under the truss and nailing each end of the strap into a face of the wall plate or under the top plate using up to sixteen nails. The cyclone strap is mounted on every truss or every second truss depending on the susceptibility of the particular location to cyclonic or other high wind conditions.

The above process can take up to 8 hours of labour for an average sized house. The process is labour intensive with a significant risk of personal injury, fatigue and mental strain. One of the reasons is that the process can require a person to manoeuvre into up to 3 different positions for each fastening process while standing on the top plate or scaffolding.

Using the structural connector 14, 62 can require as little as two steps. These include fastening the structural connector 14, 62 to the top plate, in the manner described above, while setting out the position of the roof trusses. The truss is then placed into the channels 15, 66 and the sidewalls 30 secured to the truss, in the manner described above.

The inventor(s) has found that use of the structural connector 14, 62 results in a system whereby the roof trusses are secured to the top plates in a manner in which the integrity of the fastening is at a level at least equal to that of the conventional method using cyclone straps. One of the reasons for this is that the connectors 14, 62 and the tie-down 12, 50 serve both to fasten the truss to the top plate and to act in a manner analogous to the cyclone strap.

Furthermore, use of the structural connector 14, 62 obviates the need for nail guns, which can be extremely dangerous when used in assembling a roof structure. Also, a nail gun can be heavy and cumbersome. The assembly 10 finds particular application for use with cordless screwdrivers. Cordless screwdriver technology has improved significantly, particularly the battery technology used with cordless screwdrivers. As a result, cordless screwdrivers can be used with the structural connector 14, 62 instead of nail guns, which are currently used.

The structural connector 14, 62 permits the truss to be positioned and secured in relatively quick succession. As a result, it will generally not be necessary for a builder or carpenter to return to a building site to finish off parts of the process described above. As is known, in the industry, the process of nailing "multi-grips" and cyclone straps into position is both unpleasant and dangerous. Furthermore, the structural connector 10 allows a builder or carpenter to secure roof trusses without having to adjust his or her body position repeatedly and uncomfortably.

The inventor(s) envisages that the structural connector 14, 62 would be suitable for a number of different applications apart from fastening roof trusses to top plates. For example, the structural connector 14, 62 would be suitable for use with floor joists. Also, the structural connector 14, 62 could be used to fasten conventional rafters or beams to a roof structure. Also, the inventor(s) envisages that the structural connector 14, 62 would be suitable for use with materials other than timber or lumber. For example, the structural connector 14, 62 would be suitable for metal construction, including metal framing and truss construction in a domestic housing industry.

Fabrication of the tie-down and structural connectors 12, 50, 14, 62 can be out of coils of galvanised steel. The coils are selected to suit the desired width of the channel members 12, 14. They are then subjected to an automated process of cutting, punching and bending to shape. It will be appreciated that this can result in a saving of material when compared to a process involving the punching of shapes from a blank sheet.

In FIGS. 14 to 17, reference numeral 70 generally indicates an exemplary embodiment of a fastening assembly. With reference to the preceding drawings, like reference numerals refer to like parts, unless otherwise specified. Furthermore any characteristics or attributes described with reference to the tie-down and structural connectors 12, 50, 14, 62 are applicable to the assembly 70, and vice versa, unless otherwise specified.

The fastening assembly 70 has a tie-down 72 that is substantially the same as the tie-down 12, described above.

The fastening assembly 70 has a structural connector 74. The tie-down and structural connectors 72, 74 engage each other as do the tie-down and structural connector 12, 14. However, there are some differences between the structural connector 14 and the structural connector 74.

The structural connector 74 does not include the lugs or tabs 40 that, are used for locating the structural connector 14 on the top plate 18. Instead, the floor 32 of the structural connector 74 has a positioning arrangement in the form of an external profile that is shaped so that the floor 32 can be positioned on, and nest with, a structural component, for example, an upper wall structure, such as the top plate 18.

Thus, the floor 32 is profiled so that an outer surface 78 corresponds to that of the top plate 18, allowing the floor 32 and top plate 18 to nest. As a result, location of the structural connector 74, prior to fastening, is facilitated.

The floor 32 is generally rectangular with a pair of opposed end portions 80 that are oriented generally orthogonally with respect to sides 83 of the floor 32. Each of the end portions 80 is shaped to define a lip 84. The lip 84 projects from a plane of the floor 32, oppositely to the sidewalls 30. The lip 84 has a curved profile in a plane that is orthogonal with respect to the floor 32 and the end portions 80.

As can be seen in FIGS. 14 to 17, the lip 84 accommodates the transverse junctions 22 between the sidewalls 24 and the floor 26 of the tie-down 72. This can serve to protect the structural connector, for example the top plate 18. In addition, stresses that may result from an orthogonal edge can be alleviated as a result of the curved profile. It follows that the configuration of the floor 32 can enhance the integrity of a structure using the structural connector 74.

In FIGS. 18 and 19, reference numeral 90 generally indicates an exemplary embodiment of a structural connector for fastening building components together. With reference to the preceding drawings, like reference numerals refer to like parts, unless otherwise specified. Furthermore, any attributes or characteristics described with reference to the structural connectors 14, 62, 74 apply to the structural connector 90, and vice versa, unless otherwise specified.

The structural connector 90 is structurally the same as the structural connector 74. Thus, with reference to FIGS. 15 to 17, like reference numerals used in connection with the structural connector 90 are the same as the reference numerals used in connection with the connector 74.

As can be seen in FIGS. 18 and 19, the floor 32 is fastened to the structural component, for example the top plate 18 with screws, one of which is indicated at 92, received through holes in the floor 32. The joist 17 and rafter 19 can then be fastened between the sidewalls 64. In this embodiment, the tie-down 72 is not required since the screws 92 serve to secure the channel member 74 to the structural component or top plate 18. However, it is envisaged that the tie-down 72 can be used to enhance the integrity of the connection where necessary.

Furthermore, in this embodiment, the floor 32 serves to facilitate accurate orientation of the structural connector 90 with respect to the top plate 18. In that way, the joist 17 and rafter 19 can be properly located between the sidewalls 64.

In FIGS. 20 to 24, reference numeral 100 generally indicates an exemplary embodiment of a structural connector. With reference to the preceding drawings, like reference numerals refer to like parts, unless otherwise specified. Furthermore, any attributes or characteristics described with reference to the structural connectors 14, 62, 74, 90 apply to the structural connector 100, and vice versa, unless otherwise specified.

The structural connector 100 is formed from a coil or length of metal plate, such as galvanised steel plate or stainless steel plate. The plate can have a thickness of between about 0.5 mm and 4 mm, for example between 0.95 mm and 3.00 mm, more particularly about 1.0 mm to 1.3 mm, for example about 1.15 mm.

Figure 23:
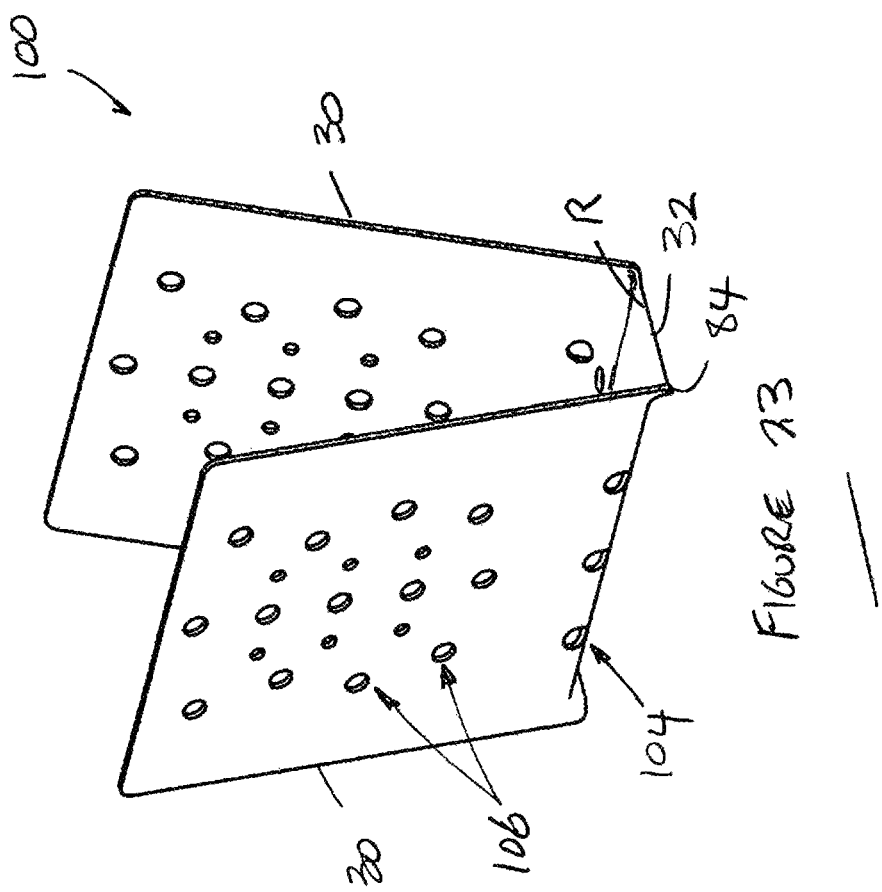
FIG. 23 shows a three-dimensional view of the structural connector in a packaged form.

The component shown in FIG. 20 is the connector 100 prior to being folded into a packaging shape (FIG. 23). The plate is thus stamped from a sheet or cut from the coil to form the unfolded connector 100. The component shown in FIG. 20 can have a length that varies, depending on its application. For example, it can have a length of between about 200 mm and 250 mm, for example, about 236 mm. Its width, which would be the length once folded, can vary depending on the application.

The connector 100 can have a variety of dimensions to suit its application. For example, once formed, the connector 100 can have a width of between about 30 mm and 115 mm, for example about 35 mm and a length of between about 80 mm and 250 mm, for example about 100 mm. Again, this can vary significantly depending on the required application.

In that configuration, a number of fastener openings 102, for example two, are formed in the floor 32. These each accommodate a shank of a fastener so that the floor 32 can be bolted or screwed into a structural component such as a top plate of a wall.

A number of inspection openings 104 are formed in each sidewall 30 at or near the junctions between the sidewalls 30 and the floor 32. These allow inspection of the manner in which the floor 32 is bolted once the sidewalls 30 are folded into their operative condition, as shown in FIG. 21, for example.

A number of screw fastener openings 106 are formed in the sidewalls 30. This allows the sidewalls 30 to be screwed into the associated structural component, as described above.

The lip 84 is formed by working the end portions 80 of the floor 32 to achieve the profiles shown in FIGS. 21 and 22. As is clear from FIG. 22, there is provided a pair of opposed nesting recesses 108, when viewed in plan that can accommodate a tie-down of the type described above.

The dimensions of the end portions 80 can vary depending on the type of tie-down and other factors. However, for the dimensions of the connector 100 provided above, the recesses 108 can have a depth of between about 1 mm to 6 mm.

The lips 84 and a remainder of the floor 32 define a recess 109, when viewed from the side, as shown in FIG. 21. The recess 109 is dimensioned to provide a nesting zone for the structural component, such as a top plate. The recess 110 has a depth of between about 3 mm and 7 mm, for example about 5 mm.

Also viewed from the side, as shown in FIG. 21, the lips 84 can have a radius of curvature, R, of between about 1 mm and 6 mm.

FIG. 23 shows a three dimensional view of the connector 100 in a packaging configuration. In that configuration, the sidewalls 30 are angled outwardly with respect to each other. This allows a number of the connectors 100 to be stacked one on top of the other. In use, the sidewalls 30 can be urged towards each other into a generally orthogonal position with respect to the floor 32 when they are fastened to the structural component.

Figure 24:
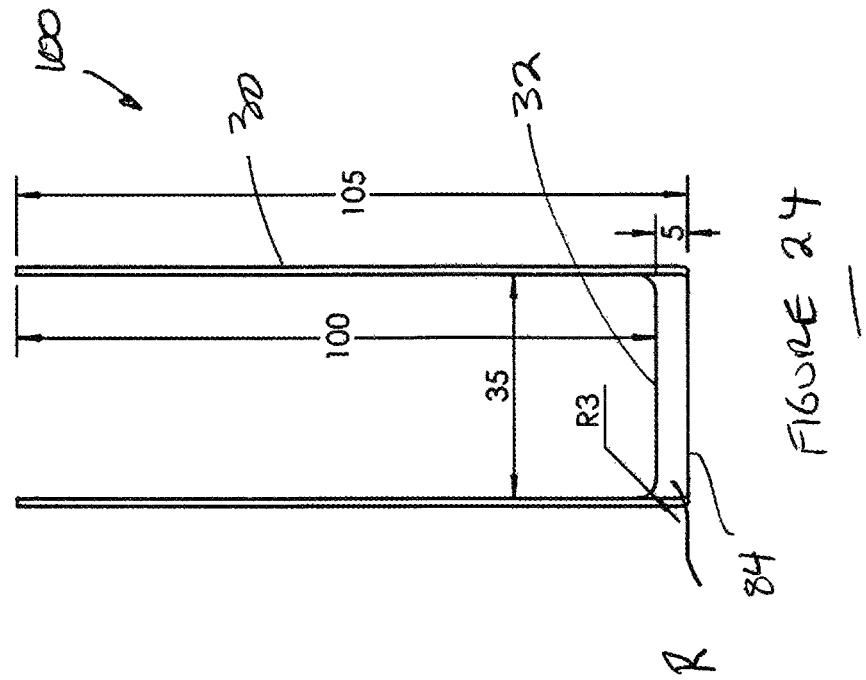
FIG. 24 shows an end view of the structural connector in an operative form.

FIG. 24 is an end view of the connector 100 showing an example of the manner in which the connector is dimensioned, in its operative condition. An overall height of the connector is between about 100 mm and 110 mm, for example about 105 mm. The sidewalls 30 are spaced between about 30 mm and 115 mm, for example about 35 mm. A radius of curvature of a junction between the sidewalls 30 and the floor 32 is between about 1 mm and 6 mm, for example about 3 mm.

In FIG. 25, reference numeral 110 generally indicates a tie-down that is suitable for use with the connector 100. With reference to the preceding drawings, like reference numerals refer to like parts, unless otherwise specified.

The tie down 110 can be formed from a blank or coil of metal plate. The metal can be galvanised steel or stainless steel. The plate can have a thickness of between 0.75 mm and 3.00 mm. For example, the plate can have a thickness of between about 1.0 mm and 2.0 mm, for example, about 1.2 mm.

However, the tie-down can be fabricated or formed in different ways, for example by moulding of a plastics material, including a reinforced plastics material.

A number of openings 112 are formed in the floor 26 of the tie down 110. These can correspond with the openings 102 in the connector 100 to accommodate the shanks of the fasteners that are received through the openings 102 in the floor 32 of the connector.

A number of further openings 114 are defined in the sidewalls 24 to permit the tie down 110 to be fastened to the structural component.

In FIG. 26, the tie down 110 is shown with the sidewalls 24 diverging from the floor 26 in a packaging configuration. This allows the tie downs 110 to be stacked one on top of the other.

FIG. 27 shows the tie down 110 with the sidewalls 24 extending generally orthogonally with respect to the floor 26 in an in use condition.

Zones of weakness, for example slotted openings 116 are defined in the sidewalls 24. These facilitate bending or folding of the tie-down 110 to assume the shape shown in FIG. 28, in which the tie-down 110 can wrap around the structural component. An example of an application is shown in FIGS. 9 and 10.

The turned down end portions 80 forming the lips 84 serve a number of purposes.

The lips 84 define transversely extending, reinforcing ribs. These provide resistance to buckling along a line between the end portions 80. Such buckling can be prone to occur when a lifting force is applied to a connector that is fastened to a structural component, beneath, for example a joist of a truss assembly. A lift force can generate a bending moment about the fastener(s) used to attach the floor 32 to the structural component. The location of the lips 84 serves to inhibit buckling due to the bending moment along a line between the end portions 80.

The curve of the lips 84 inhibits the generation of shear stress concentrations from developing in the tie down. For example, if the floor was simply flat, with rectangular edges, those edges would result in shear stress concentrations in the tie down, leading to failure earlier than with the lips 84.

The lips 84 serve to space the tie-down from a corner of the structural component on which the connector 74, 100 is seated. It follows that the structural component is protected from damage by the tie-down. Furthermore, in some cases, the tie-down is protected from damage by the structural component.

It follows that the separate connector 74, 100 and a tie down can provide a structure that has more structural integrity than a one-piece structure with similar dimensions. For example, in a one-piece structure, tension would be set up between the floor of the connector 74, 100 and the tie-down portions setting up shear stresses in the connector itself. Keeping the components separate avoids the generation of shear stresses in the connector 74, 100.

Also, in the one-piece structure, that zone of tension would be exposed to a corner of the structural connector. As a result, either the structural connector could be damaged or the structural connector could impinge on that zone, resulting in damage and failure of the connector.

The lips 84 serve to seat the connector 74, 100 correctly on the structural component. Thus, a relatively secure seating position can be achieved while the connector 74, 100 is fastened to the structural component.

A number of tests have been carried out on the connector 74, 100 and the tie-down 110.

100 tests were carried out on a connector with a formed length of about 76 mm, a height of about 105 mm and a width of about 37 mm. The material was 1.15 mm thick galvanised steel. The connector was also used with a tie-down having a height of about 134 mm, a width (length for the connector) of about 30 mm and a length (width for connector) of about 71 mm (internal) between the sidewalls. Using the tie down, the results below improved by about 100%

In each test, four 35 mm screws were used to fasten the floor 32 to the top plate. Two 35 mm screws were used to fasten each sidewall 30 to the truss.

The following data was obtained from the raw test data without the tie-down:

TABLE 1

Raw Test Data and Statistical Values

|  | 2.5 mm Load (N) | 2.5 mm Load (N) per screw | Ultimate Load (N) | Ultimate Load (N) per screw |
|---|---|---|---|---|
| Average | 9347 | 2337 | 10878 | 2720 |
| Standard Deviation | 219 | 55 | 246 | 61 |
| 5th Percentile Load | 9006 | 2252 | 10456 | 2614 |
| Coefficient of Variation | 2.34 | 2.34 | 2.26 | 2.26 |
| p | 2.5 | 1.1 | 2.5 | 1.1 |

TABLE 1-continued

Raw Test Data and Statistical Values

|  | 2.5 mm Load (N) | 2.5 mm Load (N) per screw | Ultimate Load (N) | Ultimate Load (N) per screw |
|---|---|---|---|---|
| $R_{bwl}$ | 1637 | 930 | 1901 | 1080 |
| $R_k$ | 2784 | 1582 | 3232 | 1836 |

Where "2.5 mm" represents the allowable shift and "Ultimate" refers to the load at failure.

The following tables show further results of the tests:

TABLE 1

Wind Uplift Load Capacity for Screws to Top Plate
Wind Uplift Load Capacity - 30 mm long 10 g
Screws to Top Plate (kN)

| Number of 35 mm long 10 g Screws to Top Plate | JD1 | JD2 | JD3 | JD4 | JD5 | J1 | J2 | J3 | J4 |
|---|---|---|---|---|---|---|---|---|---|
| 1 | 4.1 | 3.1 | 2.4 | 1.8 | 1.5 | 2.8 | 2.2 | 1.6 | 1.2 |
| 2 | 8.2 | 6.3 | 4.9 | 3.7 | 2.9 | 5.6 | 4.3 | 3.2 | 2.3 |
| 3 | 12.3 | 9.4 | 7.3 | 5.5 | 4.4 | 8.4 | 6.5 | 4.9 | 3.5 |
| 4 | 16.4 | 12.5 | 9.7 | 7.4 | 5.8 | 11.2 | 8.6 | 6.5 | 4.7 |
| 5 | 20.5 | 15.7 | 12.2 | 9.2 | 7.3 | 14.0 | 10.8 | 8.1 | 5.9 |
| 6 | 24.7 | 18.8 | 14.6 | 11.1 | 8.7 | 16.8 | 12.9 | 9.7 | 7.0 |

TABLE 2

Wind Uplift Load Capacity for Screws to Truss/Rafter
Wind Uplift Load Capacity - 10 g Screws to Truss/Rafter (kN)

| Number of 10 g Screws to Truss/Rafter | JD1 | JD2 | JD3 | JD4 | JD5 | J1 | J2 | J3 | J4 |
|---|---|---|---|---|---|---|---|---|---|
| 2 | 9.1 | 6.9 | 5.4 | 3.9 | 2.8 | 6.9 | 5.4 | 3.9 | 2.8 |
| 4 | 18.3 | 13.8 | 10.9 | 7.8 | 5.5 | 13.8 | 10.9 | 7.8 | 5.5 |
| 6 | 25.8 | 19.5 | 15.3 | 11.0 | 7.8 | 18.7 | 14.7 | 10.6 | 7.4 |
| 8 | 34.4 | 26.0 | 20.4 | 14.7 | 10.3 | 24.9 | 19.5 | 14.1 | 9.9 |
| 10 | 41.2 | 31.1 | 24.4 | 17.6 | 12.4 | 27.7 | 21.7 | 15.7 | 11.0 |
| 12 | 49.4 | 37.4 | 29.3 | 21.1 | 14.9 | 33.2 | 26.0 | 18.8 | 13.2 |

TABLE 3

Wind Uplift Load Capacity for Nails to Top Plate
Wind Uplift Load Capacity - 2.8 $\phi$ Nails to Top Plate (kN)

| Number of 2.8 $\phi$ Nails to Top Plate | JD1 | JD2 | JD3 | JD4 | JD5 | J1 | J2 | J3 | J4 |
|---|---|---|---|---|---|---|---|---|---|
| 1 | 0.8 | 0.6 | 0.4 | 0.2 | 0.2 | 0.5 | 0.4 | 0.4 | 0.3 |
| 2 | 1.6 | 1.1 | 0.7 | 0.5 | 0.3 | 1.0 | 0.9 | 0.7 | 0.7 |
| 3 | 2.4 | 1.7 | 1.1 | 0.7 | 0.5 | 1.5 | 1.3 | 1.1 | 1.0 |
| 4 | 3.3 | 2.2 | 1.4 | 0.9 | 0.6 | 2.0 | 1.7 | 1.4 | 1.3 |
| 5 | 4.1 | 2.8 | 1.8 | 1.2 | 0.8 | 2.6 | 2.2 | 1.8 | 1.7 |
| 6 | 4.9 | 3.4 | 2.1 | 1.4 | 0.9 | 3.1 | 2.6 | 2.1 | 2.0 |

TABLE 4

Wind Uplift Load Capacity for Nails to Truss/Rafter
Wind Uplift Load Capacity - 2.8 φ Nails to Truss/Rafter (kN)

| Number of 2.8 φ Nails to Truss/Rafter | JD1 | JD2 | JD3 | JD4 | JD5 | J1 | J2 | J3 | J4 |
|---|---|---|---|---|---|---|---|---|---|
| 2 | 3.0 | 2.3 | 1.8 | 1.3 | 1.1 | 2.3 | 1.8 | 1.3 | 0.9 |
| 4 | 6.1 | 4.6 | 3.6 | 2.6 | 2.1 | 4.6 | 3.6 | 2.6 | 1.8 |
| 6 | 8.6 | 6.4 | 5.1 | 3.6 | 3.0 | 6.2 | 4.9 | 3.5 | 2.5 |
| 8 | 11.4 | 8.6 | 6.8 | 4.8 | 4.0 | 8.2 | 6.5 | 4.6 | 3.3 |
| 10 | 13.6 | 10.3 | 8.1 | 5.8 | 4.8 | 9.1 | 7.2 | 5.2 | 3.6 |
| 12 | 15.5 | 11.7 | 9.2 | 6.6 | 5.4 | 11.0 | 8.7 | 6.2 | 4.4 |

TABLE 5

Wind Uplift Load Capacity for Screws to Steel Top Plate
Steel Frame - Saddle Capacity (kN)

| Screwed | Top Plate Fixings | 0.75 mm | 0.95 mm | 1.15 mm |
|---|---|---|---|---|
| 10 g | 2 | 3.1 | 4.0 | 4.1 |
|  | 4 | 6.2 | 8.0 | 8.3 |
|  | 6 | 9.3 | 12.0 | 12.4 |
| 12 g | 2 | 3.5 | 4.9 | 5.1 |
|  | 4 | 7.0 | 9.9 | 10.3 |
|  | 6 | 10.5 | 14.8 | 15.5 |
| 14 g | 2 | 3.7 | 5.3 | 5.8 |
|  | 4 | 7.5 | 10.7 | 11.7 |
|  | 6 | 11.3 | 16.1 | 17.6 |

Where JD1 to JD5 refers to the "Joint Group" classification system which is based on the ability of the seasoned timber species to restrain the loads of mechanical fasteners. For example, JD3 refers to seasoned, mixed Australian hardwoods, JD4 refers to mixed seasoned rainforest species or mixed Australian grown pine species, or Radiata pine and JD5 refers to timbers such as slash pine and Douglas Fir grown elsewhere. J1 to J5 are the same, except that the timber is unseasoned.

Table 5 illustrates the example of the connector being fastened to a steel top plate, as opposed to a timber top plate. The figures "0.75 mm, "0.95 mm and 1.15 mm" refer to the thickness of the steel used.

In FIGS. 29 to 39, reference numeral 120 generally indicates an exemplary embodiment of a fastening assembly. With reference to the preceding drawings, like reference numerals refer to like parts, unless otherwise specified.

The fastening assembly 120 is suited for use with hollow masonry building elements, such as hollow concrete blocks 129 (FIGS. 33 to 39). The blocks 129 are conventional in the sense that they have a pair of opposed sidewalls 121 and a pair of opposed end walls 123 that bound or define a volume 125.

When the blocks 129 are laid, the volumes together define a space for services and reinforcing bars before being filled with concrete or some other settable material. The space extends all the way from a top course to a bottom course of the blocks 129.

One (FIGS. 33 to 35) or two (FIGS. 36 to 38) reinforcing bars 127 are positioned between the uppermost and next course of blocks 129. This is often a building requirement.

The fastening assembly 120 includes a connector 122 that is similar to the connector 74, 100. However, it will be appreciated that the connector 122 can have a flat floor instead of the floor 32 with the lips 84. Furthermore, it is envisaged that in, some embodiments, the connector 122 can be in the form of a channel member of a suitable material, such as steel, reinforced plastics or even a form of composite.

The assembly 120 includes a bar support or hanger 144 that can be fastened to the connector to support the reinforcing bar(s) 127 in position relative to the connector 122. The hanger 144 is a steel rod 124 that is bent to define a hook 126 and a shank 128. It is envisaged that the hanger 144 could be a flexible tie, such as a length of cable.

The shank 128 is threaded and can be received through one of the openings 102. A positioning nut 131 is threaded on to the shank to be located in a position in which it can support the connector 122 an appropriate distance from the hook 126. The shank 128 is then received through one of the openings 102. A nut 130 can be threaded onto the shank 128 to secure the rod 124 to the connector 122 by clamping the floor 32 between the nuts 130, 131.

As described above, the floor 32 can have two openings 102. It follows that two hangers 144 can be used with each connector 122 where a stronger tie-down is required.

It will be appreciated that the hanger 144 can be supplied in a large number of different sizes to suit the application. The sizes are determined by the dimensions of the block 129.

Alternatively, the rod 124 can be cut on site to suit the application or the block size.

The assembly 120 includes a support arrangement for supporting the connector 122 and the hanger(s) 144 on the sidewalls 121. The support arrangement includes a carrier 132. The carrier 132 is in the form of an elongate, generally rectangular metal plate 134 that can be received between the sidewalls 30 so that a central portion 136 overlies the floor 32 of the connector 122. The central portion 136 defines a pair of openings 142 that correspond with the openings 102 in the floor 32. Thus, the central portion 136 can also be clamped between the nuts 130, 131. This procedure is illustrated in FIGS. 29 to 32.

Opposed end portions 138 extend from the central portion 136 to bear on the sidewalls 121. Thus, when the central portion 136 is fastened to the floor 32, the connector 122 is oriented orthogonally with respect to the uppermost course and can be used to support a beam 140 (FIG. 34, 35) on the uppermost course, in the manner described above.

The end portions 138 can be shaped to correspond with the sidewalls 121 such that the sidewalls 121 can nest or clip into engagement with the carrier 132. Thus, the end portions 138 can be profiled to define a channel, recess or rebate 146 to receive the sidewalls 121. The shape of the end portions 138 thus serves to locate or position the sidewalls 30 of the connector 122 operatively, for example into alignment, with respect to the structural component to be fastened to the block 129.

In use, the fastening assembly 120 is assembled as shown in FIGS. 29 to 32. The reinforcing bar(s) 127 are positioned in the hook 126 and the opposed end portions 138 are clipped onto or otherwise positioned on the sidewalls 121. An assembly with one bar 127 is shown in FIGS. 33, 34 and 35. An assembly with two bars 127 is shown in FIGS. 36 and 38.

It will be appreciated that a structural component, such as a beam or truss rests on the end portions 138 rather than directly on the block 129. This serves to protect a timber structural component from rot that may result from raising damp. It can serve to protect a metal structural component from corrosion. Thus, the end portions 138 serve as a damp course.

The end portions 138 also serve to inhibit damage to the structural component that may result from the structural component resting directly on concrete blocks.

At present, it is necessary to support the reinforcing bars in the correct position while the concrete is poured. That is done in a number of ways. These include wall ties that are mounted in the blocks to support the bars. Another method marketed under the Gang-Nail trade mark is to secure a tie between the truss and the reinforcing bar. The former has little structural integrity. The latter can result in shear stresses being set up in the tie.

The fastening assembly 120 eliminates the need for such devices. Furthermore, the fastening assembly 120 performs two functions. These are providing a connection for a structural component, such as a beam or truss and positioning the reinforcing bar(s) correctly prior to pouring concrete. As a result, a significant amount of time can be saved by using the fastening assembly.

At present, structural components such as beams and truss assemblies are secured to the top course of blocks in a number of different ways. For example, a cleat system is often used that ties the sides of a truss assembly down to a block wall. However, this can generate shear stress concentrations in both the truss assembly and the cleats. Use of the fastening assembly 120 results in the generation of direct tension stresses, so inhibiting the generation of shear stress concentrations.

One such cleat system has cleats that are fixed to the reinforcing bars and then bolted to respective sides of the truss or beam. This system results in the generation of shear stress concentrations, as described above. In one test, a single cleat fastened to one side of a truss provided an uplift capacity of 16 KN and a system in which a cleat was fastened to both respective sides provided an uplift capacity of 22 KN. On the other hand, an embodiment of the fastening assembly 120, including the structural connector 100 provided an uplift capacity of 42 KN.

A number of tests were carried out on a fastening assembly 120 in which the connector 122 was fabricated of 1.2 mm thick steel. The carrier 132 was of 2 mm thick steel and a 5 mm thick washer was interposed between the nut 130 and the carrier 132. The rod 124 had a diameter of 12 mm.

The following tables show the results obtained when the fastening assembly was used to fasten a timber truss to the blocks 129.

TABLE 1

| | Uplift Capacity (kN) | | |
|---|---|---|---|
| Fixings | JD3 | JD4 | JD5 |
| 30 mm × 12 gauge, hex head 1 Rod 124 hooked on to 2 bars 127 | 4 into each side of truss 24 kN | 5 into each side of truss 24 kN | 8 into each side of truss 24 kN |

TABLE 2

| | Uplift Capacity (kN) | | |
|---|---|---|---|
| Fixings | JD3 | JD4 | JD5 |
| 30 mm × 12 gauge, hex head 2 Rods 124 hooked on to 2 bars 127 | 7 into each side of truss 42 kN | 9 into each side of truss 42 kN | 11 into each side of truss 33 kN |

The following tables show the results obtained when the fastening assembly was used to fasten a steel truss to the blocks 129.

TABLE 1

| | Uplift Capacity (kN) | | |
|---|---|---|---|
| Fixings | 0.75 mm | 0.95 mm | 1.15 mm |
| 30 mm × 12 gauge screws 1 Rod 124 hooked on to 2 bars 127 | 6 into each side of truss 21.3 kN | 6 into each side of truss 24 kN | 6 into each side of truss 24 kN |

TABLE 2

| | Uplift Capacity (kN) | | |
|---|---|---|---|
| Fixings | 0.75 mm | 0.95 mm | 1.15 mm |
| 30 mm × 12 gauge screws 2 Rods 124 hooked on to 2 bars 127 | 8 into each side of truss 28.4 kN | 8 into each side of truss 34.4 kN | 8 into each side of truss 34.4 kN |

Where "0.75 mm", "0.95 mm" and "1.15 mm" refer to the thickness of the steel used for the truss.

A previous tie-down system makes use of elongate rods that are bolted onto each side of a plate located on the truss or beam. These rods are cast into the wall and are significantly longer than a height of just one course. They can thus be costly. Furthermore, this system cannot be used to locate the beams or trusses and have no functionality with respect to the reinforcing bar(s) 127.

Tradesmen and builders are generally known to make use of standard connectors such as Triple Grips, Multi Grips & Cyclone Straps. Each of these connectors requires the tradesmen to drive up to 10-15 nails per connector. When originally developed, these connectors were specifically designed for hand driven nails. With use of nail guns to save time, tradesmen are attempting to gun nail these connectors to structural components. There are two main problems that Independent Engineers and Certifiers observe with this type of tie down.

Firstly, nail gun injuries are on the rise as contractors attempt to drive nails through metal which results in dangerous ricocheting of nails.

Secondly, up to 7 out of 10 structural connectors fastened with gun nails are poorly installed according to the manufacturers of these connectors. The result of poorly installed connectors is poor structural safety and poor structural safety means noncompliance with building codes and insurance risks to building organisations.

The inventor(s) submits that there are more than 150 tie down connectors that need to be installed to secure the roof trusses to the wall frame for an average house. The process either using a nail gun or hammer can be laborious, resulting in undue stress upon the body of the tradesmen/carpenters.

The fastening assemblies described herein can alleviate these problems by increasing speed of installation and improving strength of connection between structural components. Safety is also relatively enhanced since the fastening assembly is particularly suited for powered screw drivers.

In this specification, including the claims, the following words are to be interpreted as set out below:

a. "Structural Component"—This is any component that is connected to another component during the erection or building of a structure, such as a building. It can be used interchangeably with "building component".

b. "Timber"—This is a wood-based material. When applied to pure wood, it refers to processed logs of wood. It is to be regarded as equivalent to "lumber" in those countries in which "lumber" is used instead of "timber".

c. "Position"—As a verb, this is to be interpreted as including any activity in which an article or component is placed with respect to another component prior to being fastened to that component.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

Various substantially and specifically practical and useful exemplary embodiments of the claimed subject matter are described herein, textually and/or graphically. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter unless otherwise stated.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

a. there is no requirement for the inclusion of any particular described or illustrated characteristic, function, activity, or element, any particular sequence of activities, or any particular interrelationship of elements;

b. no characteristic, function, activity, or element is "essential";

c. any elements can be integrated, segregated, and/or duplicated;

d. any activity can be repeated, any activity can be performed by multiple entities, and/or any activity can be performed in multiple jurisdictions; and e. any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub range defined by such separate values is incorporated into the specification as if it were individually recited herein. For example, if a range of 1 to 10 is described, that range includes all values there between, such as for example, 1.1, 2.5, 3.335, 5, 6.179, 8.9999, etc., and includes all sub ranges there between, such as for example, 1 to 3.65, 2.8 to 8.14, 1.93 to 9, etc.

The use of words that indicate orientation or direction of travel is not to be considered limiting. Thus, words such as "front", "back", "rear", "side", "up", down", "upper", "lower", "top", "bottom", "forwards", "backwards", "towards", "distal", "proximal", "in", "out" and synonyms, antonyms and derivatives thereof have been selected for convenience only, unless the context indicates otherwise. The inventor envisages that various exemplary embodiments of the claimed subject matter can be supplied in any particular orientation and the claimed subject matter is intended to include such orientations.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

The invention claimed is:

1. A structural connector for fastening structural components together, the structural connector comprising:
   a floor, the floor curving at respective end portions of the floor to define each of a pair of opposed lips, the lips oriented generally orthogonally with respect to respective sides of the floor and having a radius of curvature at a junction between the lips and the floor of between about 1 mm and 6 mm;
   two spaced sidewalls extending from the respective sides of the floor, oppositely to the lips, wherein transitions from the floor and the sidewalls to the floor are curved and terminate at respective edges of the lips, wherein the floor and the sidewalls define a first channel for receiving a first of the structural components, the sidewalls being configured to fasten to the first structural component; and
   the floor and the lips define a positioning arrangement configured to position the floor on a second structural component for fastening to the second structural component.

2. The structural connector as claimed in claim 1, in which the second structural component is in a form of an upper wall structure.

3. The structural connector as claimed in claim 2, in which a external profile positioning arrangement is shaped to position the floor on, and nest with, the upper wall structure.

4. The structural connector as claimed in claim 3, in which the floor defines at least one opening to fasten the floor to the upper wall structure by a fastener received through the at least one opening.

5. The structural connector as claimed in claim 4, in which the sidewalls and floor are configured to receive the first structural component between the sidewalls, generally orthogonally with respect to the second structural component and fastened to the sidewalls.

6. The structural connector as claimed in claim 5, in which the first structural component is a joist and rafter of a truss assembly configured to be received between the sidewalls.

7. The structural connector as claimed in claim 4, in which the floor is generally rectangular.

8. The structural connector as claimed in claim 1, in which the positioning arrangement includes a carrier that is fastened to the floor, the carrier being configured to engage upper edges of opposed sidewalls of the second structural component in the form of a hollow block of a block wall, the carrier also being configured to support the floor and the structural connector sidewalls between the opposed sidewalls of the second structural component.

9. The structural connector as claimed in claim 8, in which the carrier is in a form of an elongate, generally rectangular metal plate configured to be received between the structural connector sidewalls and includes a central portion configured to overlie the floor and end portions to bear against the upper edges of the opposed sidewalls of the second structural component.

10. The structural connector as claimed in claim 9, in which the end portions are shaped to correspond with the opposed sidewalls of the second structural component to thereby nest or clip the opposed sidewalls of the second structural component into engagement with the carrier.

11. The structural connector as claimed in claim 8 in combination with at least one hanger that is fastened to the floor to depend from the floor, the at least one hanger being configured to support one or more reinforcing bars located within the block wall, the structural connector and the at least one hanger forming a fastening assembly.

12. The structural connector as claimed in claim 11, in which the at least one hanger is in the form of an elongate rod that defines a hook configured to receive the one or more reinforcing bars and a threaded shank that is received through an opening in the floor and fastened to the floor with one or more nuts threaded on to the shank.

13. The structural connector as claimed in claim 1 in combination with a tie-down, the tie-down including:
   a tie-down floor that is configured for positioning on the floor of the structural connector; and
   two spaced tie-down sidewalls extending from respective sides of the tie-down floor, the tie-down floor and the tie-down sidewalls defining a channel that opens oppositely to the channel of the structural connector for receiving the second structural component, the channel of the tie-down being configured to connect to the second structural component,
   the structural connector and the tie-down forming a fastening assembly.

14. A method of fastening structural components together comprising the steps of:
   fastening a floor of a structural connector to a second structural component, the floor curving at respective end portions of the floor to define each of a pair of opposed lips, the lips oriented generally orthogonally with respect to respective sides of the floor, wherein the structural connector further includes:
   two spaced sidewalls extending from the respective sides of the floor oppositely to the lips, wherein transitions from the sidewalls to the floor are curved and terminate at respective edges of the lips, the floor and the sidewalls defining a channel for receiving a first structural component, the sidewalls being configured to fasten to the first structural component; and
   a positioning arrangement configured to position the floor on the second structural component for fastening to the second structural component, the positioning arrangement being defined by the floor and the lips; and
   fastening the first structural component between the sidewalls of the structural connector.

\* \* \* \* \*